Figure 18:
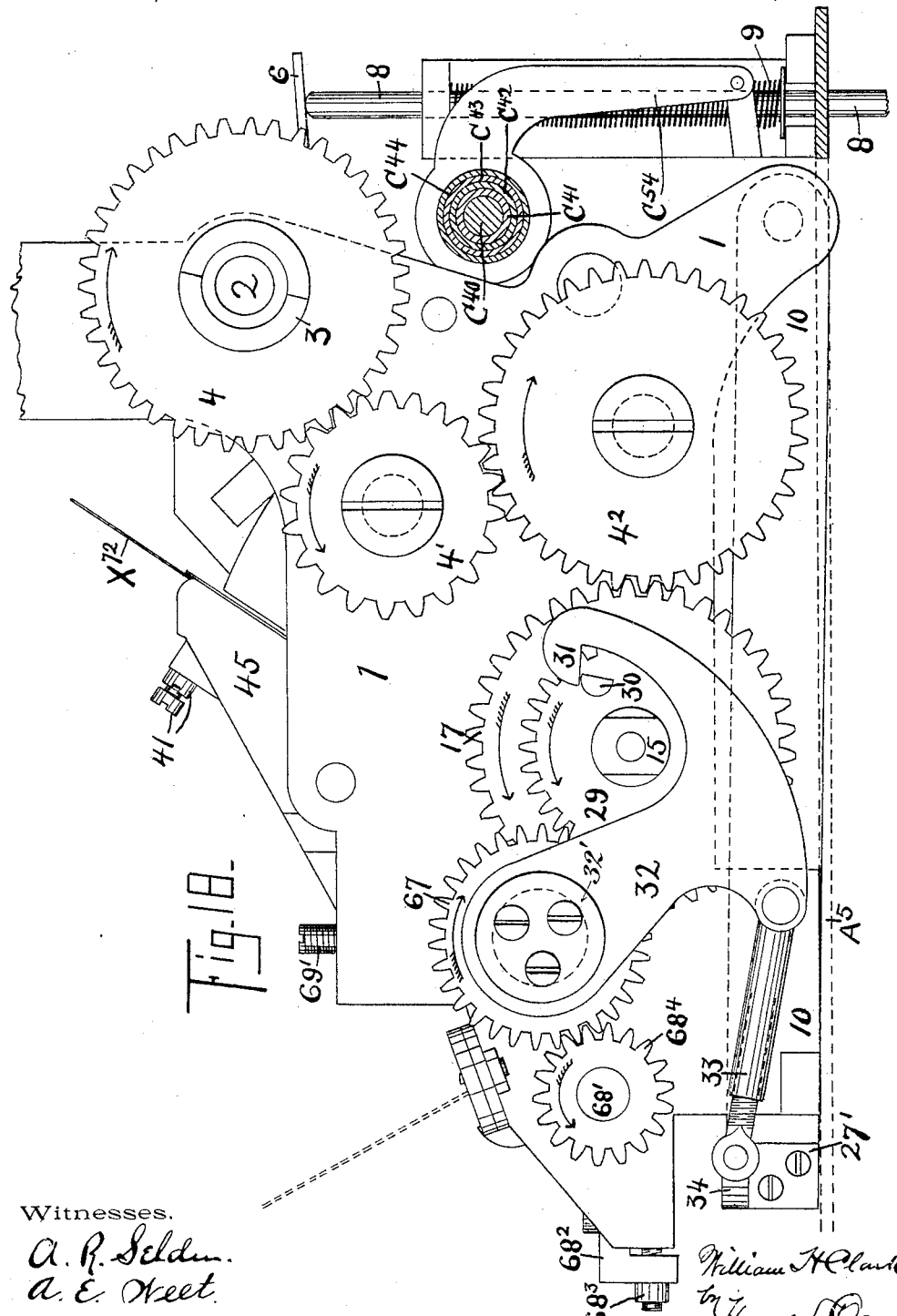

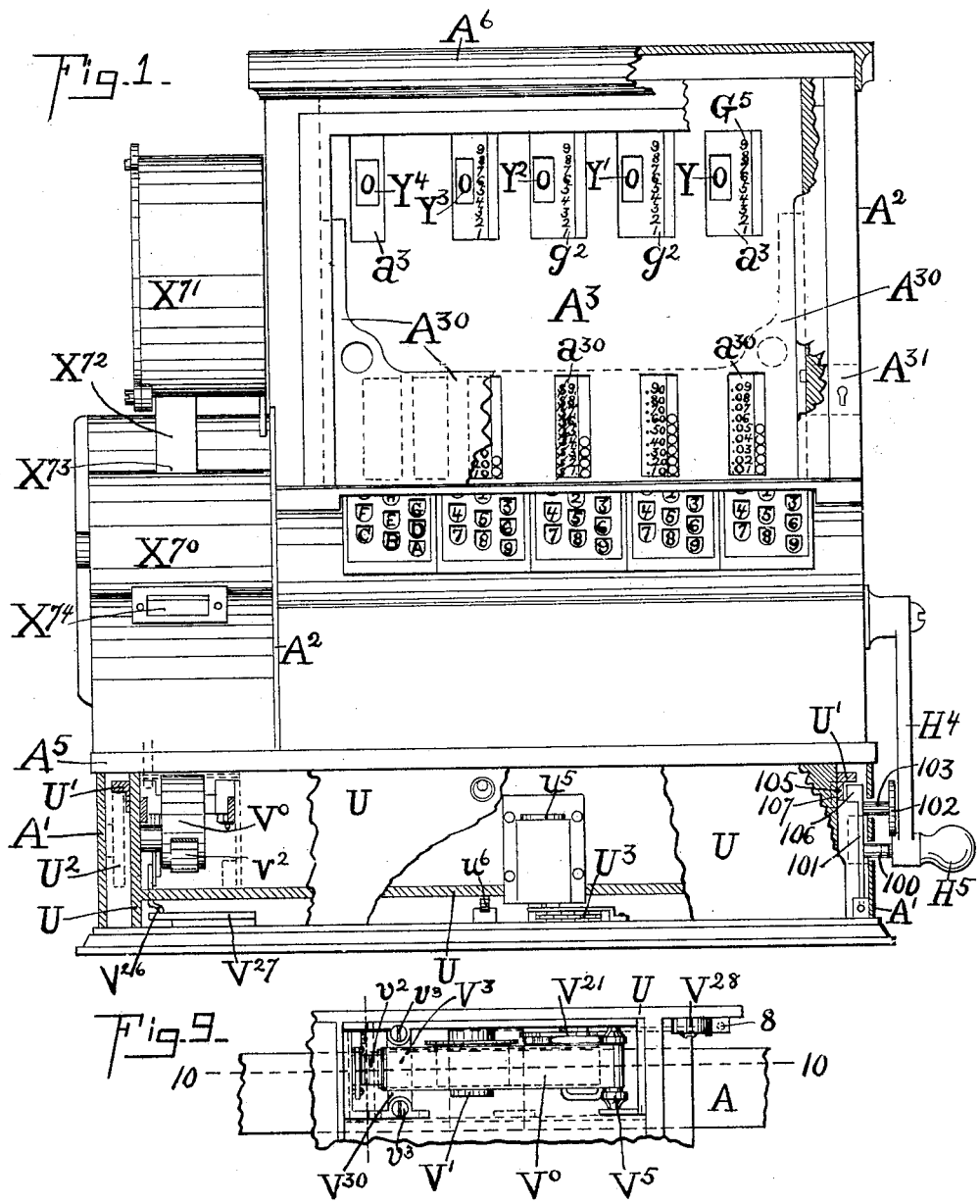

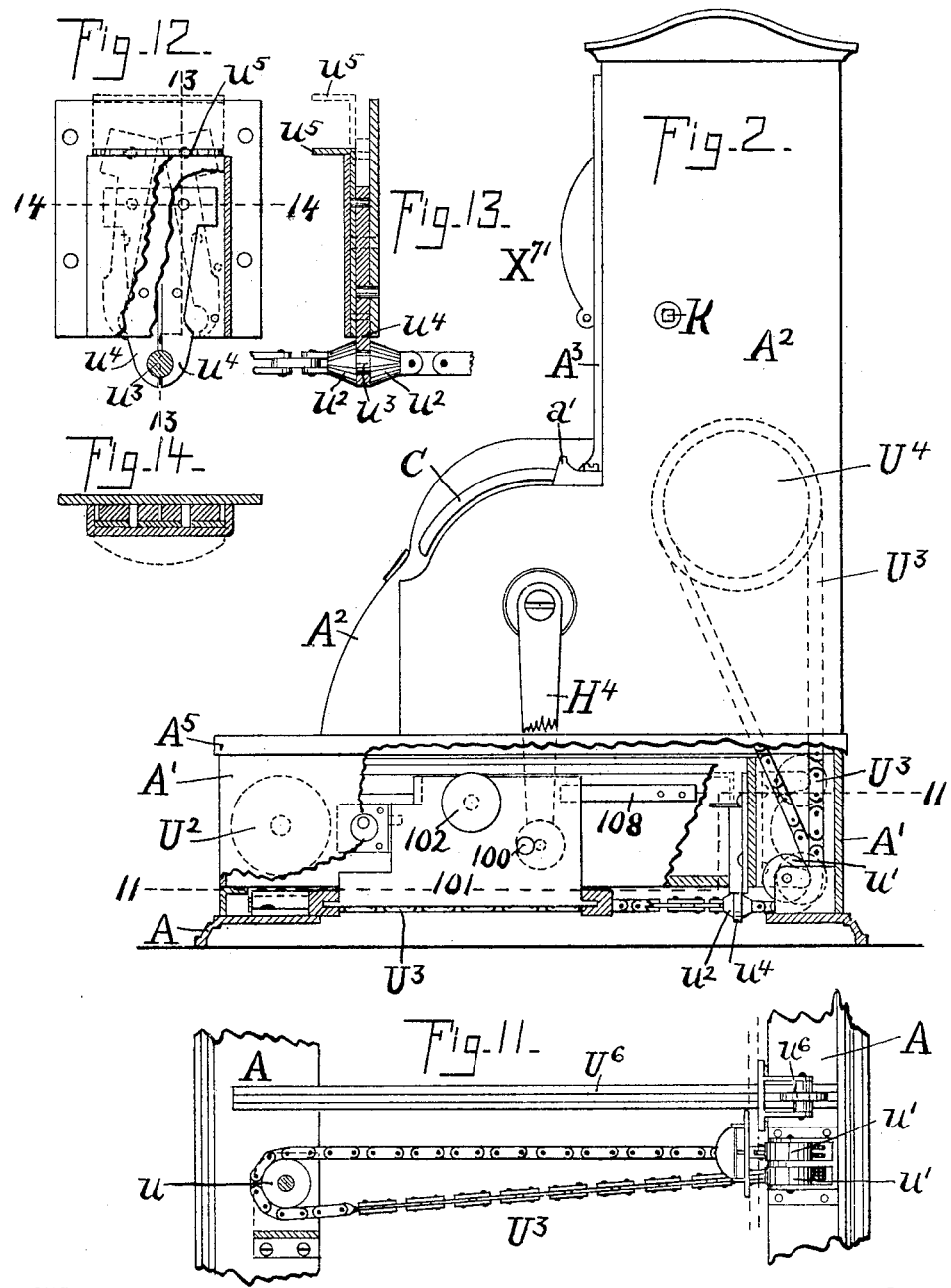

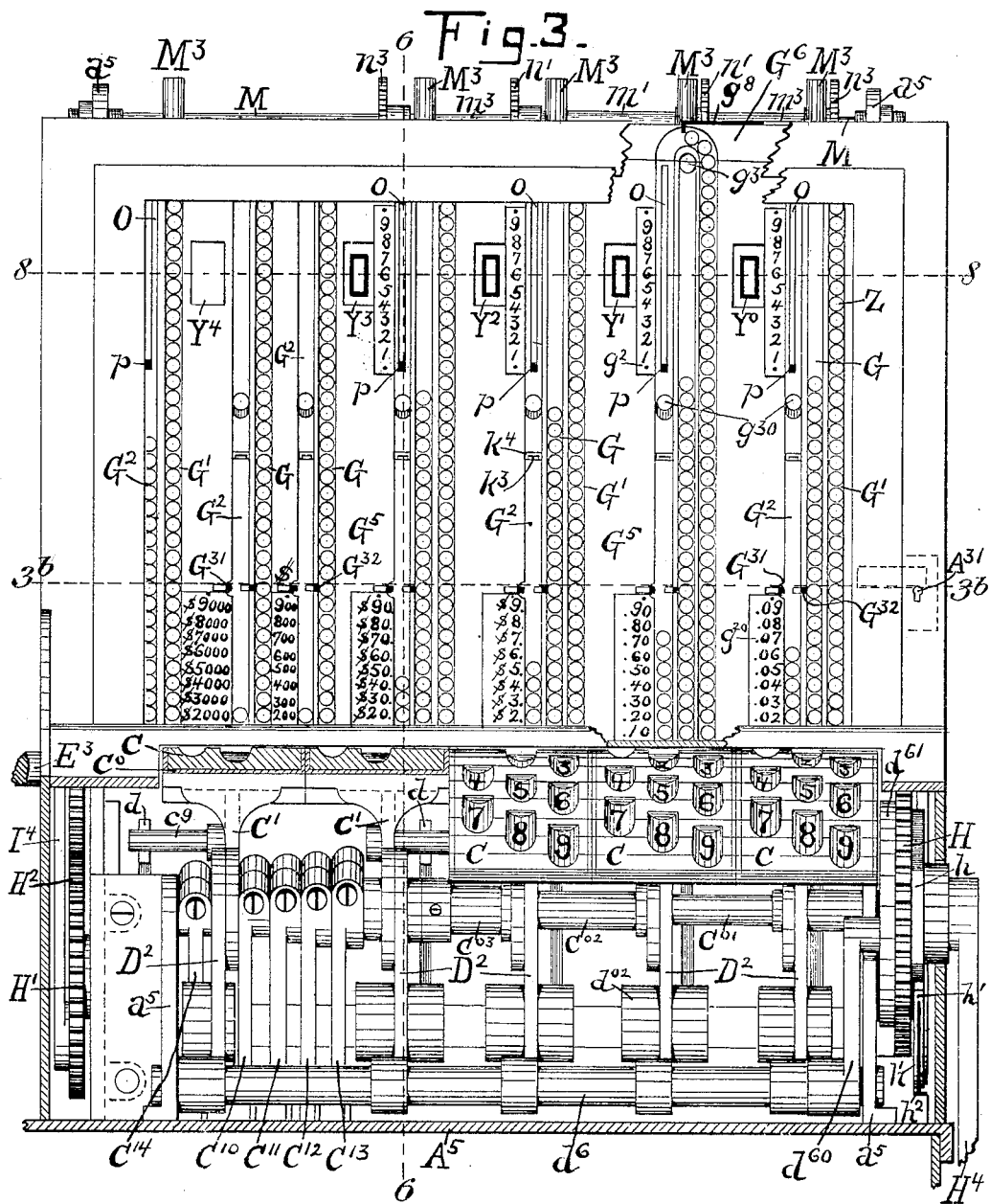

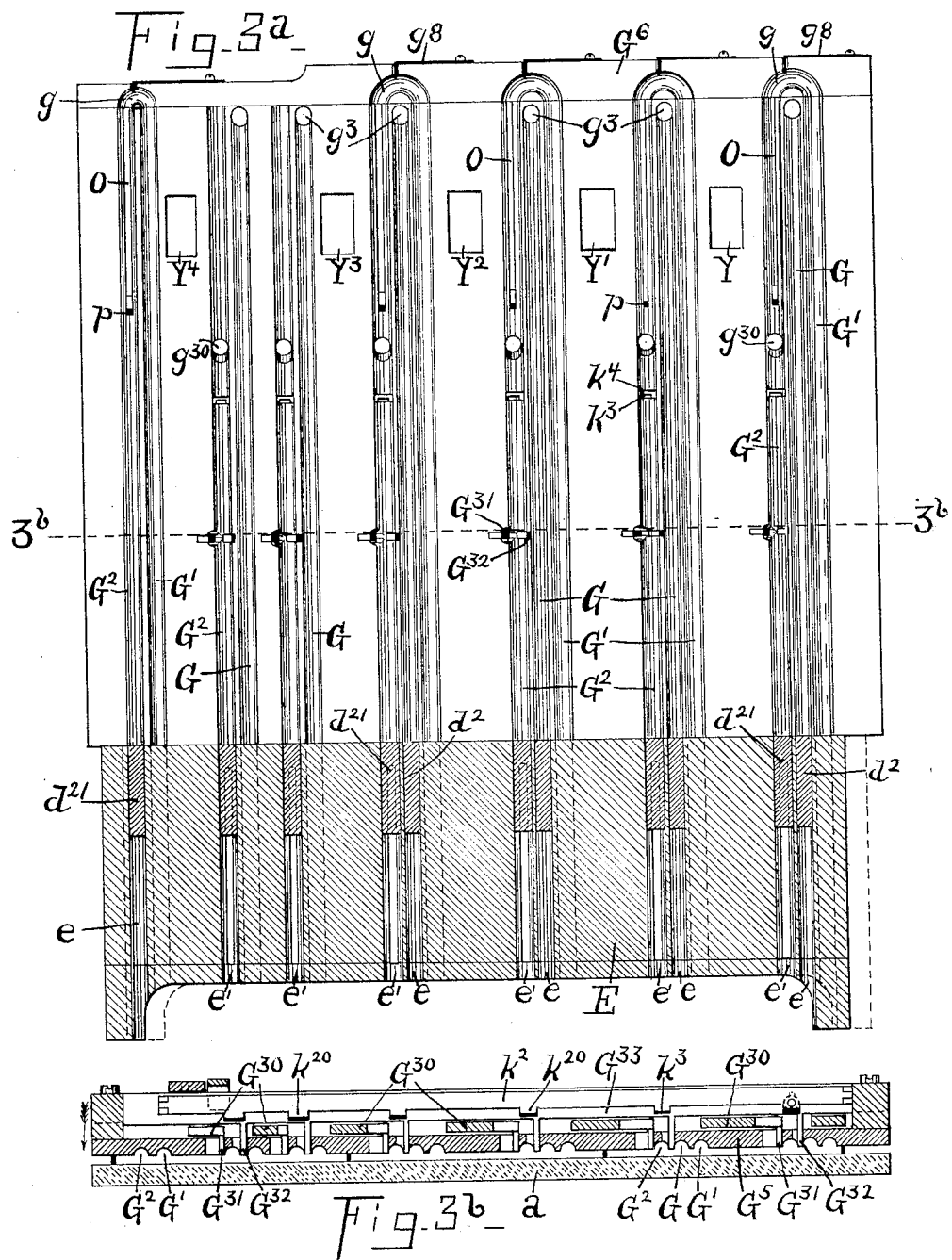

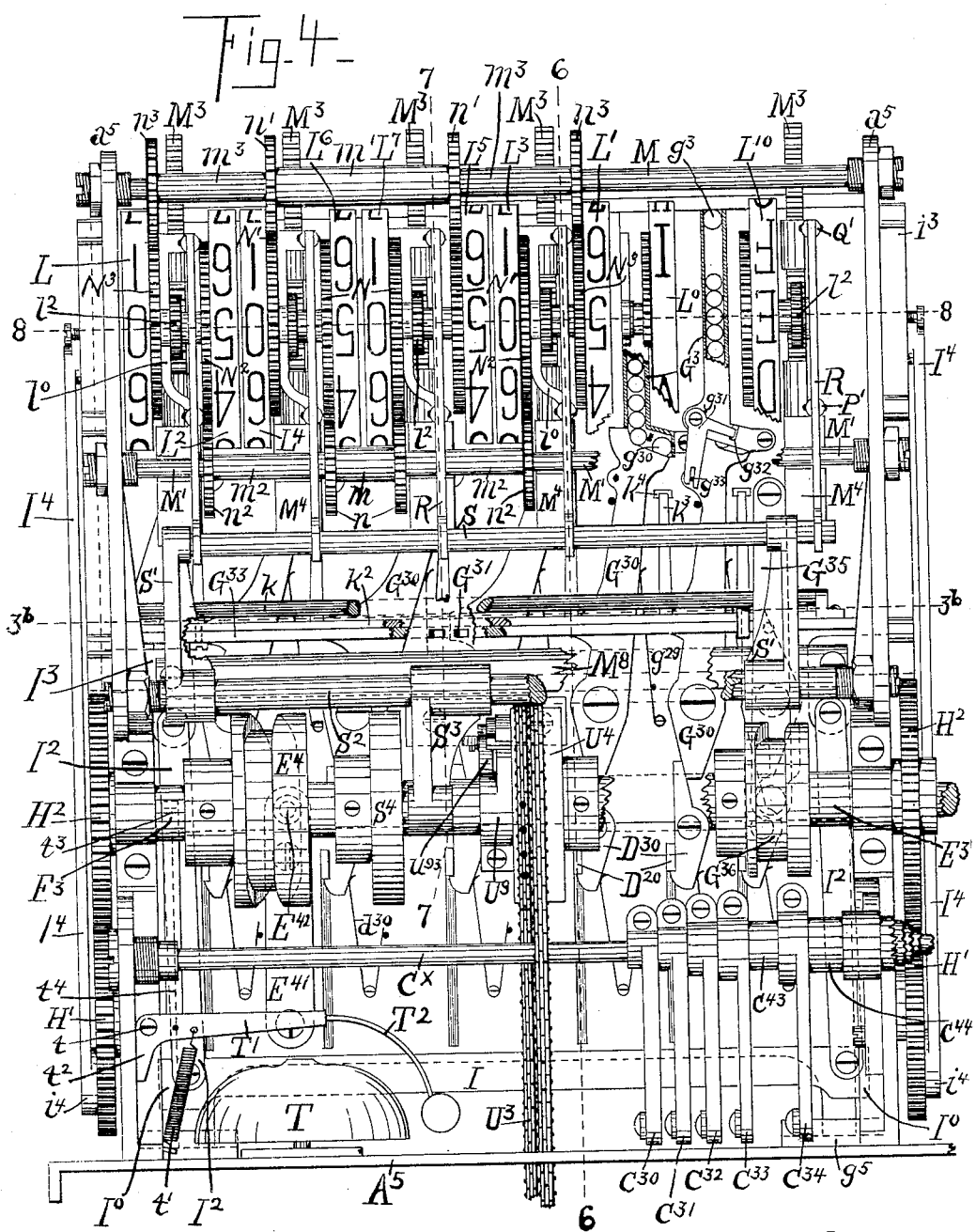

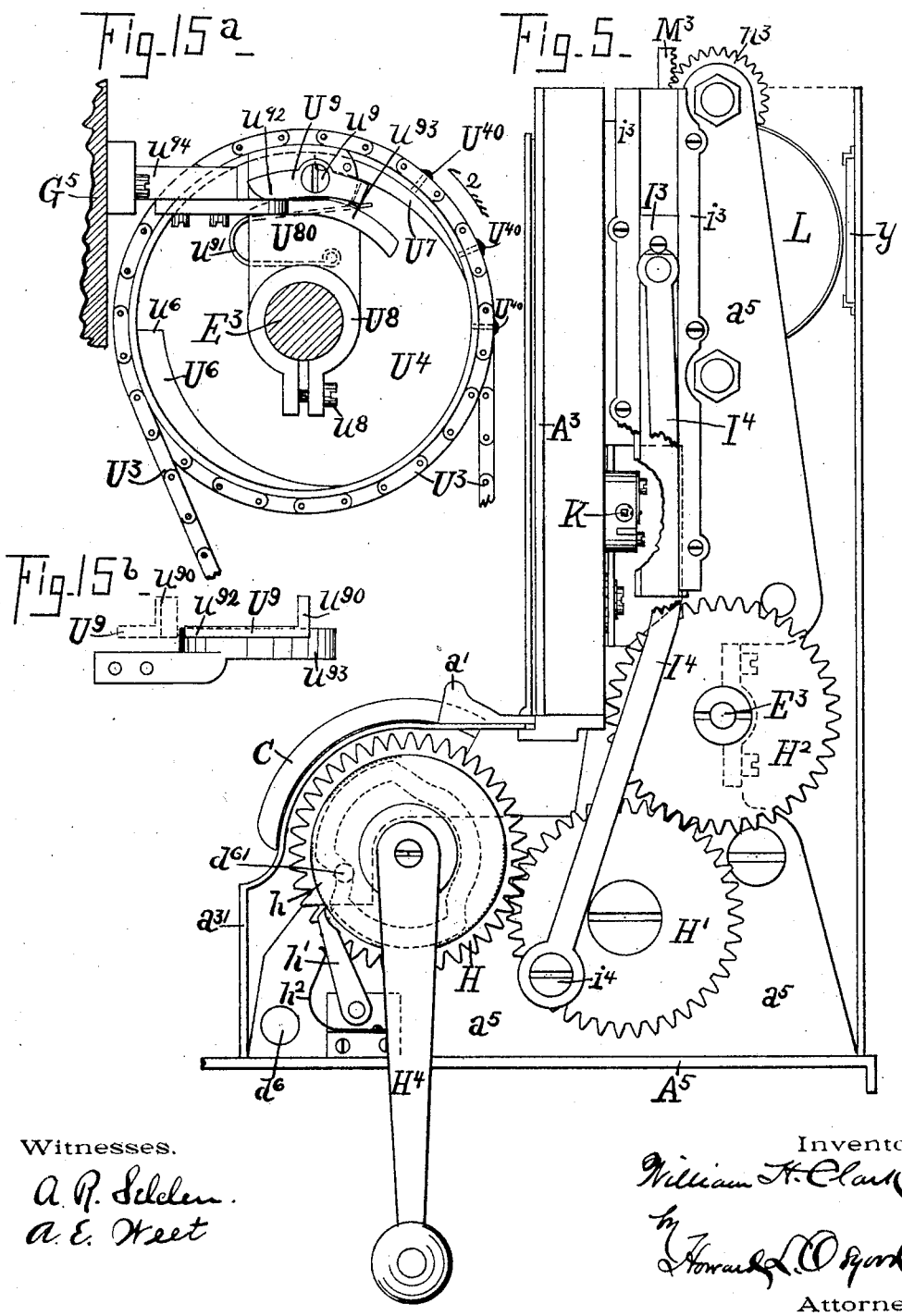

(No Model.)  13 Sheets—Sheet 7.
W. H. CLARK.
CASH REGISTER, INDICATOR, AND CHECK PRINTER.
No. 596,359. Patented Dec. 28, 1897.
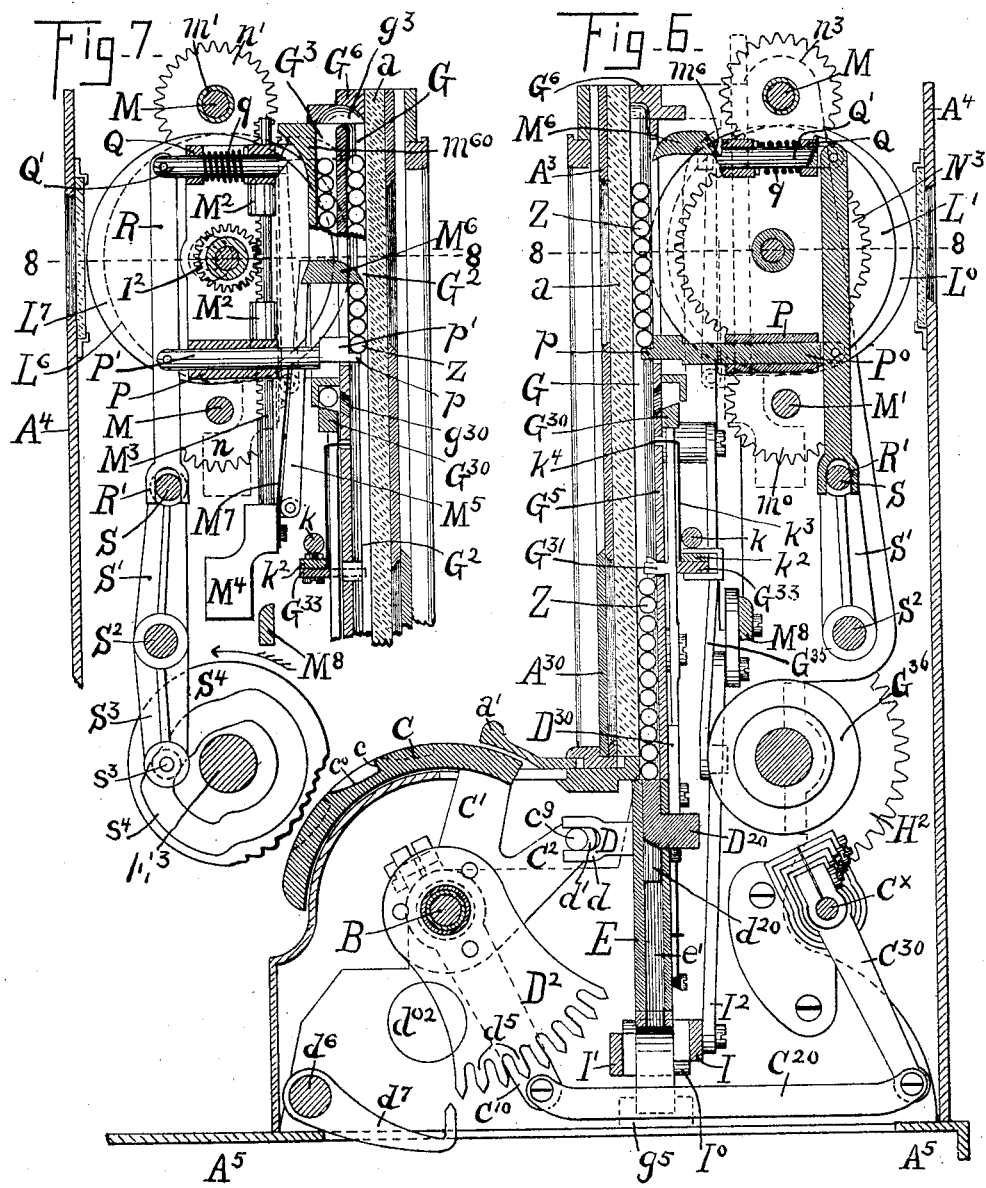
Witnesses.
A. R. Selden
A. E. Street
Inventor.
William H. Clark
by Howard L. Osgood
Attorney.

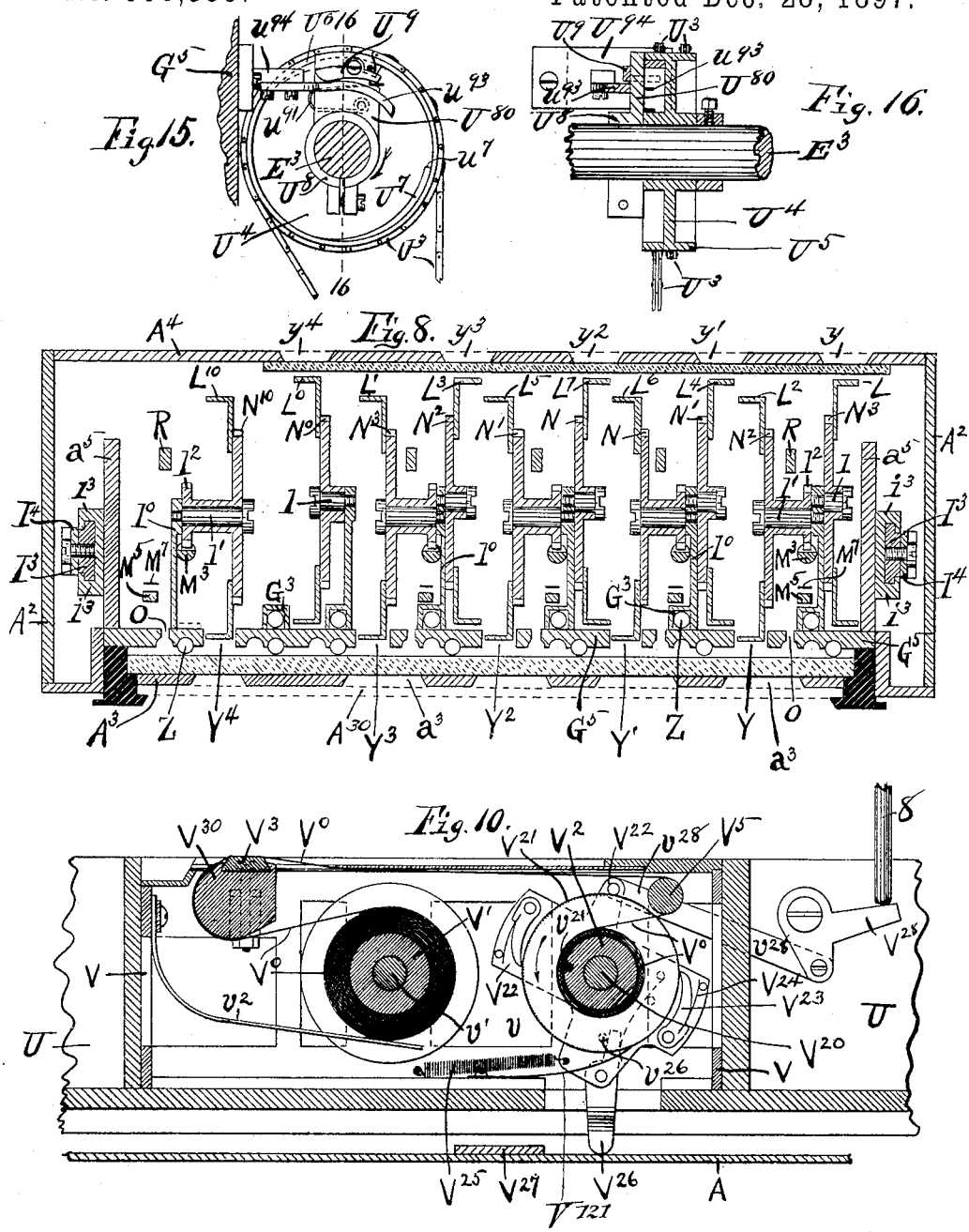

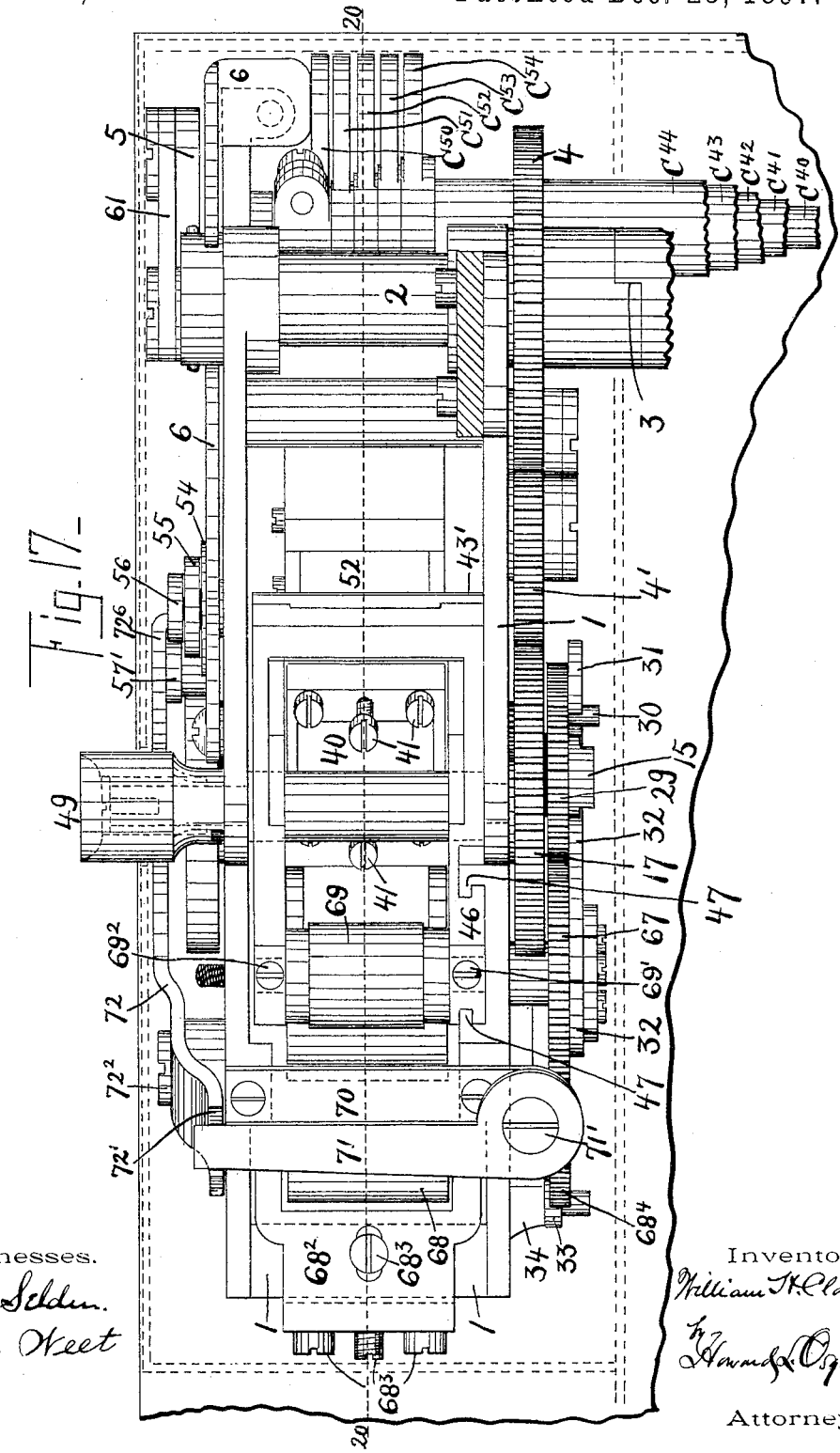

(No Model.)  13 Sheets—Sheet 10.
W. H. CLARK.
CASH REGISTER, INDICATOR, AND CHECK PRINTER.
No. 596,359.  Patented Dec. 28, 1897.

Witnesses.
A. R. Selden.
A. E. Weet.

William H Clark
by Howard L. Osgood
Attorney.

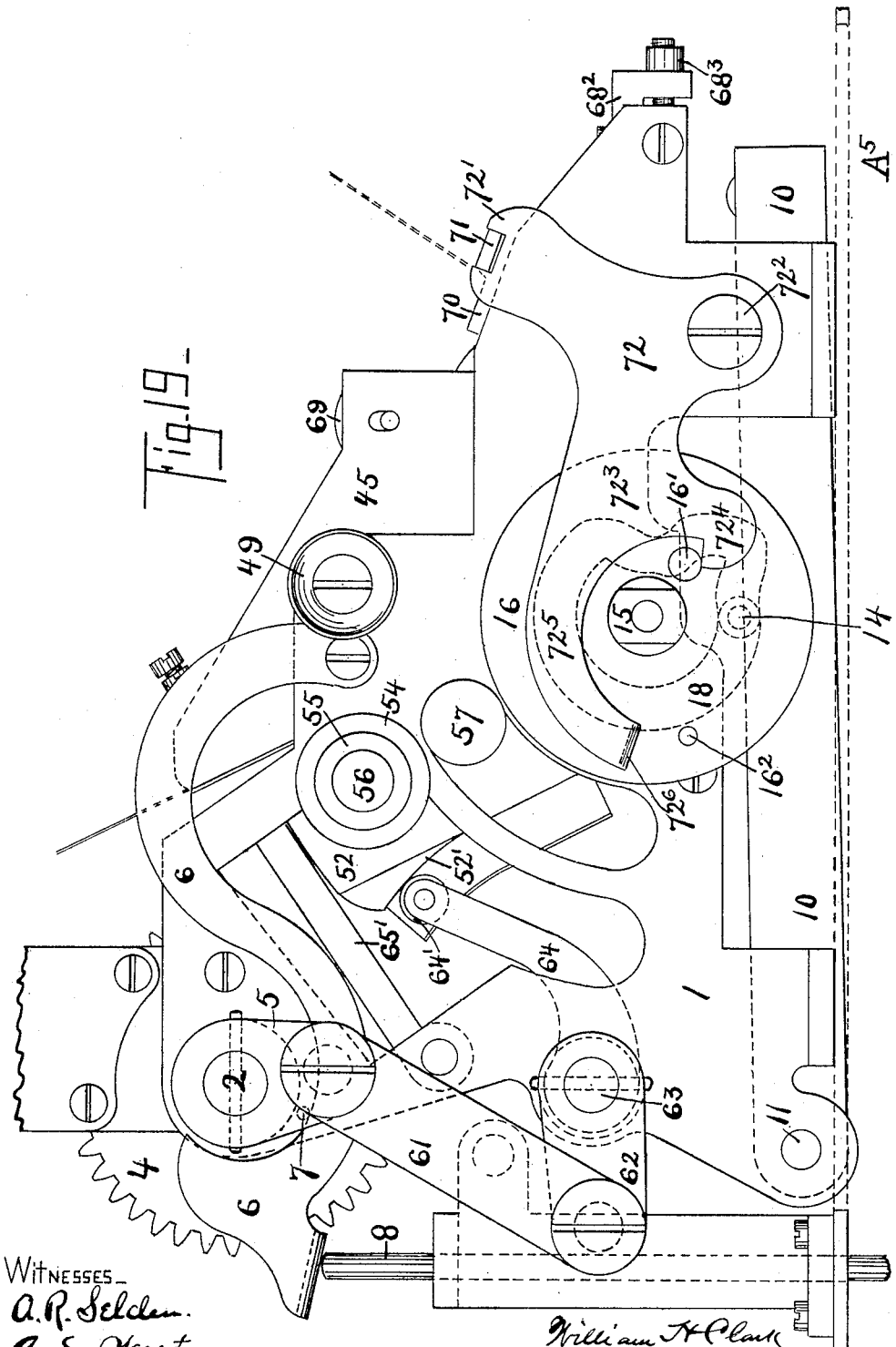

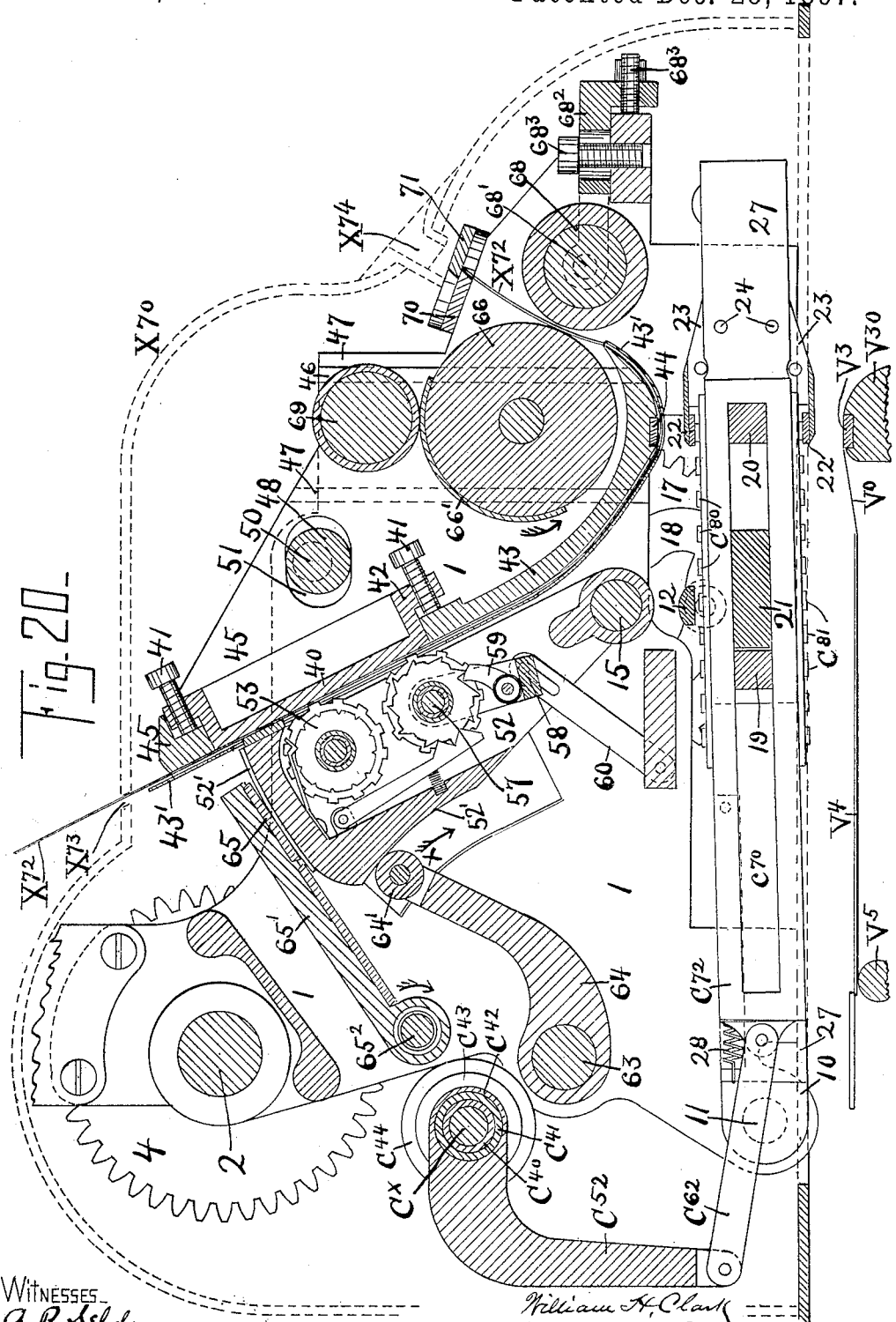

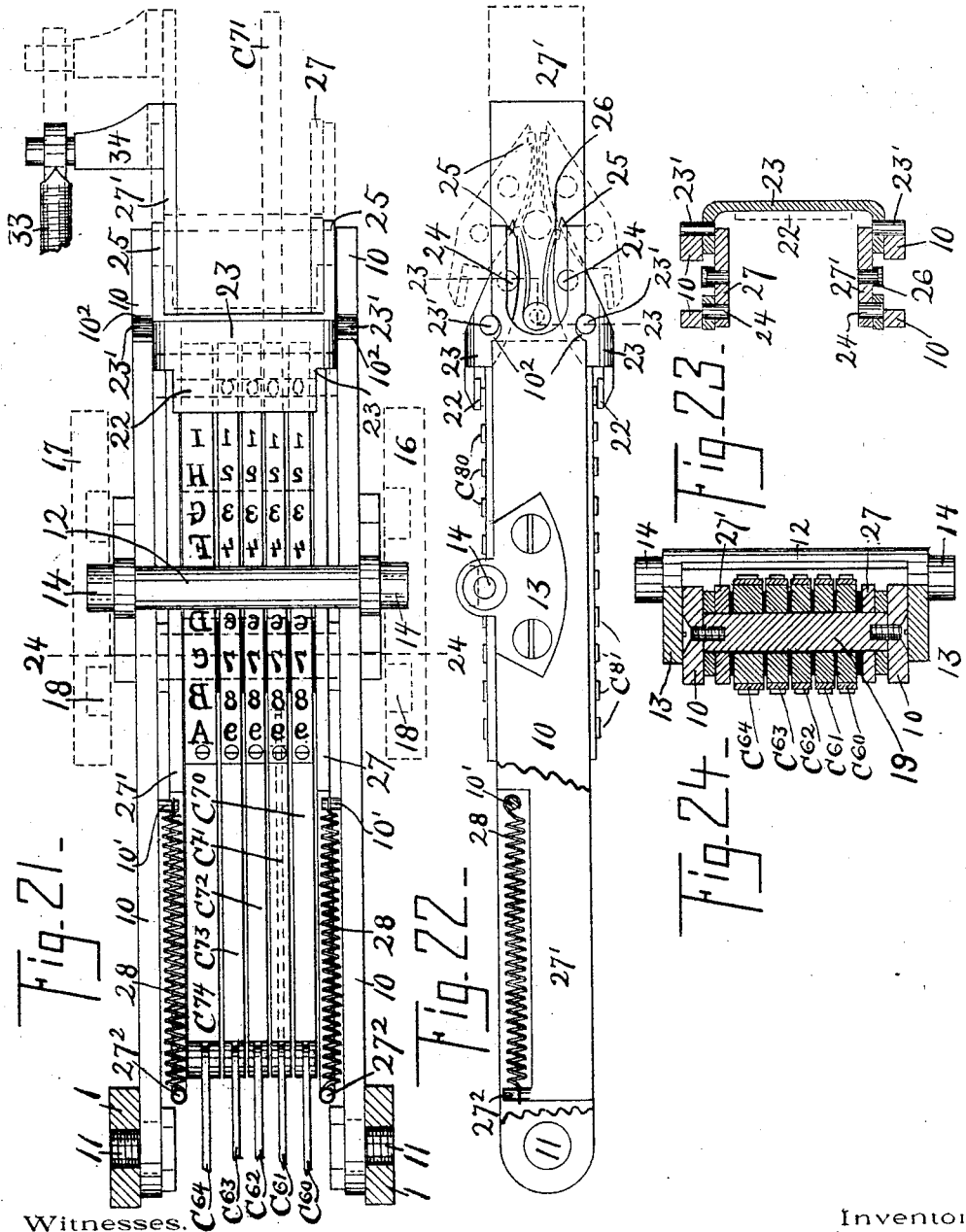

United States Patent Office.

WILLIAM H. CLARK, OF ROCHESTER, NEW YORK, ASSIGNOR TO THE ROCHESTER CASH REGISTER COMPANY, OF SAME PLACE.

CASH REGISTER, INDICATOR, AND CHECK-PRINTER.

SPECIFICATION forming part of Letters Patent No. 596,359, dated December 28, 1897.

Application filed November 6, 1896. Serial No. 611,231. (No model.)

*To all whom it may concern:*

Be it known that I, WILLIAM H. CLARK, a citizen of the United States, and a resident of the city of Rochester, Monroe county, New York, have invented certain new and useful Improvements in Cash Registers, Indicators, and Check-Printers, of which the following is a specification, reference being had to the accompanying drawings, in which—

Figure 1 is a front elevation of a mechanism embodying my invention, parts being removed to exhibit construction. Fig. 2 is a side elevation of one of my devices, parts being removed to exhibit construction and showing in dotted lines the positions of parts of the drawer-operating mechanism. Fig. 3 is a front elevation of a part of my mechanism, parts of the case being removed and portions of the finger-pieces being also removed in order to exhibit construction. Fig. $3^a$ is a front elevation of the way-plate and a vertical section through the transfer-bar. Fig. $3^b$ is a cross-section on line $3^b$ $3^b$ of Fig. $3^a$. Fig. 4 is a rear elevation of one of my devices, parts being removed to exhibit construction. Fig. 5 is an end elevation of the upper portion of one of my devices, the end of the case being removed to exhibit construction, the device being seen from the same point of view as Fig. 2. Fig. 6 is a cross-section on the line 6 6 of Fig. 3. Fig. 7 is a cross-section on the line 7 7 of Fig. 4. Fig. 8 is a section on the line 8 8 of Figs. 4, 6, and 7. Figs. 9 and 10 are respectively a top plan of the record-roll mechanism and an enlarged section on the line 10 10 of Fig. 9. Fig. 11 is a section on the line 11 11 of Fig. 2, showing a part of the drawer-operating mechanism under the drawer. Figs. 12, 13, and 14 are respectively a front elevation (with parts broken away) and vertical and transverse sections on the lines 13 13 and 14 14 of Fig. 12. Figs. 15 and $15^a$ are side elevations of the drawer-operating pulley in different positions. Fig. $15^b$ is a top plan of the dog and stationary cam of said drawer-operating pulley. Fig. 16 is a cross-section on the line 16 16 of Fig. 15. Fig. 17 is a top plan of the printing mechanism. Fig. 18 is a side elevation of the said printing mechanism. Fig. 19 is a side elevation of the other side of said printing mechanism. Fig. 20 is a longitudinal section on the line 20 20 of Fig. 17. Fig. 21 is a top plan view of the printing-bars of said printing mechanism and their inking apparatus. Fig. 22 is a side elevation of the same parts. Fig. 23 is a cross-section on the line 23 23, Fig. 22. Fig. 24 is a cross-section on the lines 24 24 of Fig. 21.

My invention relates to cash-registers of the class denominated "two-motion" and also to details, which may or may not be embodied in machines of that class.

The novel features of my said invention are described herein and are pointed out in the claims which follow.

This cash-register gives temporary indications of the individual operations of the machine, adds or totalizes the amounts of these operations, indicates the character or origin of the particular operation, opens a cash-drawer, prints the amount and the character or origin of each transaction upon a record-strip, prints the same matter upon a check, together with other matter, as desired, and delivers the check from the machine.

In the register here shown the computation is accomplished by the movements of series of tally-pieces, each series representing a different denomination, and these movements are effected by first setting the mechanism and then forcing the movements by a power device.

The machine rests upon a base A, supporting a drawer-casing A', open in front, for the drawer U. The drawer-casing supports a drawer-plate $A^5$. This drawer-plate supports the indicating and registering mechanism, which is inclosed inside a case comprising end plates $A^2$, a front plate $A^3$, a back plate $A^4$, and a top $A^6$. The front plate $A^3$ has two series of perforations $a^3$ and $a^{30}$ for exposing the indicating and registering devices, and the registering devices are covered by a movable plate $A^{30}$, which can be moved to expose the register or may be held shut by a lock $A^{31}$. The movable plate $A^{30}$ is shown in Fig. 1, partly in full lines and partly in dotted lines, part thereof being broken away to exhibit the construction back of it.

A curved front plate $a^{31}$ completes the front of the case between the plate $A^3$ and the drawer-plate $A^5$. On the drawer-plate and against one end plate is a casing $X^{70}$ to contain the printing mechanism, and the same end plate near the casing $X^{70}$ supports a casing $X^{71}$ for containing a web of paper $X^{72}$, which is led into the printing mechanism through a slot $X^{73}$ and is delivered therefrom through a slot $X^{74}$.

The setting means separates a desired number of tally-pieces from a store of tally-pieces and sets a series of type-carriers in position to print a number and other characters, if so desired. These setting means consist of the following mechanisms: A shaft B is mounted in the supporting-frame $a^5$, which extends upwardly from the drawer-plate $A^5$, and said shaft extends horizontally across the machine. A series of finger-plates C (one for each denomination) are carried by the arms C' and are journaled on this shaft B. The finger-plates have preferably all the numerals of one denomination (nine numerals when the notation is decimal) in succession displayed upon their faces, so that but one finger-plate is necessary for each denomination. They may, however, display such amounts and in such denominations as are best suited to the business for which the register is intended. Adjacent to each numeral is a finger-stop $c$, (see Fig. 6,) with which the finger makes contact when placed on the plate over a numeral to set the mechanism to the amount of the numeral.

The finger-plates are preferably made of glass and have in them a series of depressions $c^0$, corresponding in position to the desired positions of the numerals or other characterizing-marks which it is desired to use. Each depression, as shown in Fig. 6, may be shallow at one end and deepen to the other end, where there is a vertical wall, in order to form the finger-stops $c$, just referred to. These finger-stops give the finger a definite position with reference to the plate. As the plate is pushed back the finger comes in contact with a stop-bar $a'$. At the back of the glass plate C are the numerals or other characterizing-marks, which are plainly visible through said glass. The glass plates rest on bases $C^0$, and the numerals or characters may be marked in or on the back of the glass or on the base or on material between the glass and the base. The numerals are arranged under the depressions $c^0$, so that when the stop for any numeral is at the stop-bar the movement of the plate has been just sufficient to set the mechanism to register the amount of said numeral. In order to economize space, the depressions $c^0$ on each finger-plate are graduated across the plate successively in successive diagonal rows in the machine shown. The number of rows on a plate is regulated by the amount of space desired for each finger-stop. In the construction shown there are three rows, as this makes a convenient arrangement for the nine numerals "1" to "9" of each denomination, as provided in the machine shown. The plate to the right, as shown in Figs. 1 and 3, relates to the units or cents register, the next plate to the tens or dimes register, the next plate to the left to the hundreds or dollars register, and so on up to such capacity as may be desired to give to the machine. The last plate to the left is provided with a series of letters and relates to that part of the indicating and printing mechanism which indicates and prints a letter or other characterizing-mark to indicate and identify the class of goods sold or the salesman or the department making the sale or the character of the sale or for any other suitable use.

The supporting-arm C' of each of the series of finger-plates extends from a sleeve (hereinafter described) carried by the shaft B, and extending from said arm or from said sleeve is another arm $C^2$, which is rocked by the movement of the finger-plate, so that the inner end of this latter arm has substantially vertical movement in proportion to the movement of the finger-plate.

The bar E, in which the separation of the tally-pieces for computation is accomplished, I term the "transfer-slide." This slide is located immediately under the way-plate $G^5$ (see Figs. 4 and 6) and reciprocates under said way-plate in guides $g^5$. It is provided with separating-ways $e$ and transfer-ways $e'$, which extend vertically through the slide.

The way-plate $G^5$ is provided with vertical ways G G' $G^2$, which I term, respectively, the "storage," "elevating," and "registering" way. They are constructed by grooving the plate $G^5$ and placing it against the front plate $a$, which is preferably of glass. The storage-way G in the operation of the machine is so replenished that it always has in it a number of tally-pieces. The registering-way $G^2$ contains the tally-pieces indicating the temporary and permanent or totalized amounts of registration, and the tally-pieces are received therein and are discharged therefrom as the operation proceeds. Reading-scales $g^2$ and $g^{20}$ are provided at a point in each registering-way. The scales are graduated with divisions separated by a diameter of the thickness of a tally-piece, and, if the notation is decimal, have nine divisions, each with proper denominational marks. The scale $g^2$, adjacent to the upper part of the registering-way $G^2$, is an indicating-scale, and, with the balls held against it, constitutes an indicator of the particular transaction. The scale $g^{20}$, adjacent to the lower part of the registering-way, is for reading the register proper and shows the totalized amount of the respective transactions. In Fig. 3 the scales $g^{20}$ show a registration of the totalized amount of "$1,145.76."

The separating-ways $e$ are in the position of rest directly under and in line with the storage-way G, and the transfer-way $e'$ is directly under the registering-way $G^2$. (See full lines in Fig. 3ª.) As the transfer-slide E is reciprocated in the operation of the machine the separating-way $e$ is moved under the elevating-way $G'$, (see dotted lines in Fig. 3ª,) is there held stationary a short time, and is then returned to its initial position; and the same movement carries the transfer-way $e'$ under the storage-way G, when the pause in the movement takes place, and is then returned to place.

A vertical slot $e^2$ is cut through the front wall of each of the ways $e$. Sliding in these slots are the slides D, from which extend the ears $d$, in which are the elongated slots $d'$, in which play the pins $c^9$. These pins $c^9$ are long enough to maintain their positions in the slots $d'$ during the lateral movement of the ears $d$ incident to the movement of the transfer-slide. The slots allow the movement of the pins incident to the pivotal movement of the arms $C^2$. Within the separating-ways $e$ are the plug-slides $d^2$, attached to the slides D, so that the plug-slides $d^2$ are carried up and down with the slides D.

It will be noted that in the position of rest the separating-way $e$ is under the storage-way G, and as the plug-slide $d^2$ is lowered the tally-pieces pass down into the separating-way, and that the number will be proportional to the downward movement of the plug-slide. The stops $c$ on the finger-plate C are so graduated from the bar $a'$ that a movement of the plate so as to bring any stop to the bar will, through the connected mechanisms, lower the plug $d^2$ sufficiently to allow a number of tally-pieces to enter the separating-way equal to the number represented by the stop $c$ brought to the bar, so that if the first or "1" stop is brought to the stop-bar $a'$ one tally-piece is lowered into the separating-way, and if the "9" stop is brought to the bar nine tally-pieces are lowered.

In order that the plug-slide $d^2$ may be accurately stopped at an exact diameter of a tally-piece or a multiple thereof, so as to bring the upper tally-piece always just flush with the top of the transfer-slide, I provide the following additional mechanism: Attached to the same sleeve with the arms $C'$ and $C^2$ is a segment-plate $D^2$. (See Fig. 6.) This plate has on its periphery a series of teeth $d^5$, which correspond in number to the finger-stops $c$ upon the plate C and are so spaced as to represent the distance of the respective finger-stops from each other. On a shaft $d^6$, parallel to the shaft B, are a series of dogs $d^7$, one for each segment-plate $D^2$ and each having a point adapted to enter between the teeth $d^5$ of its segment-plate. The shaft $d^6$ is actuated by a lever $d^{60}$, Fig. 3, which is rocked by a cam $d^{61}$, Fig. 5, actuated by the operating-handle. The shape of the cam-groove $d^{62}$ of the cam $d^{61}$ is shown in dotted lines in Fig. 5, and it is so shaped as to actuate the lever $d^{60}$ as soon as the operating-handle starts, keeping the dog in engagement with the segment during the movement of the transfer-bar in one direction, releasing the segment-plate during the movement of the transfer-bar in the other direction, and then reëngaging the segment and at the end of the revolution of the handle releasing the segment-plate again. Hence as soon as the setting of the finger-plate has been made and the operating handle or lever is actuated the dog $d^7$ rises and enters into a recess between two teeth $d^5$, and inasmuch as said dog fits said recess closely the segment-plate $D^2$ is moved, if it does not register exactly with the tooth of the dog, until it does so register, and thus the finger-plate C is adjusted exactly with reference to the stop-bar $a'$, and thereby the plug-slide $d^2$ is moved so that the highest point of the upper tally-piece in the transfer-bar is, as soon as its operating movement commences, exactly flush with the top of said bar. This brings the line of separation between the tally-pieces in the transfer-bar and those in the ways in the plate $G^5$ into such a position as to permit the transfer-slide to be moved laterally without pinching a tally-piece when the separating-ways in the transfer-bar are moved out of coincidence with the ways in the way-plate $G^5$. This pinching would occur if a single tally-piece was so situated as to be partly in each way when the transfer-bar moved and would stop the action of the machine.

The upper end of the elevating-way $G'$ is connected with the upper end of the registering-way $G^2$ by a curved connecting-way $g$, which is preferably in a small top plate $G^6$. Extending through a slot in the top of the top plate into the connecting-way $g$ is a spring friction-plate $g^8$. This friction-plate retains the last tally-piece in the way $g$ in position, so that when ejected from under the plate the tally-piece will immediately fall into the registering-way. The friction-plate also prevents any tally-pieces from being carried over into the registering-way by momentum, except those which are positively forced past the friction-plate.

The movement of the tally-pieces in effecting a registration may be briefly described as follows: The number of tally-pieces corresponding to the number of the stop on the finger-plate C brought to the stop-bar $a'$ are lowered from the storage-way G into the separating-way $e$. The transfer-slide is then moved to bring the separating-way under the elevating-way $G'$. The plug-slide $d^2$ is then raised, forcing tally-pieces from the separating-way into the elevating-way and at the same time forcing an equal number of tally-pieces through the way $g$ over into the registering-way $G^2$, where the tally-pieces accumulate and indicate the registration by said accumulation. The mechanism for effecting these movements is as follows: Back of the transfer-slide and way-plate is a shaft $E^3$, bearing a circular cam $E^4$, provided with a cam-slot adapted to cause such a lateral motion as to shift the transfer-slide E sidewise a distance sufficient to bring the way $e'$ from under the registering-way $G^2$ to a position under the storage-way G, and at the same time to bring the way $e$ from under the storage-way G to a position under the elevating-way G'. An arm $E^{41}$ is rigidly attached to the transfer-plate E and bears upon its end a pin $E^{42}$, (shown in dotted lines in Fig. 4,) which pin extends into the groove in the cam $E^4$. Consequently a revolution of the shaft $E^3$ moves the transfer-plate E from normal position to the transfer position above described, and thence back to normal again. On each end of the shaft $E^3$ is a gear $H^2$ on the outside of the frame $a^5$ of the machine. Each gear $H^2$ meshes with another gear $H'$ of equal pitch. On one side of the machine the gear $H'$ again meshes with another gear of equal pitch, H, which is journaled on the outside of the frame and which is operated by a crank $H^4$, provided with a suitable handle $H^5$. On the shaft of the wheel H is a ratchet-disk $h$, having on its periphery a series of ratchet-teeth, and pivoted to the frame of the machine is a dog $h'$, which engages said ratchet-teeth and is constantly pressed against them by a spring $h^2$. This dog and ratchet-disk prevent backward rotation of the crank $H^4$. The shaft of the wheel H also bears and turns the cam $d^{61}$ for operating the locking-dogs $d^7$.

Close to the rear face of the transfer-slide is a bail I, which moves with said slide, but also rises and falls vertically. This bail, in fact, is double and has a counterpart bail I' (see Fig. 6) close in front of said transfer-slide. These two bails are fastened together by end pieces $I^0$, which extend around the ends of the transfer-slide. The bails I I' are moved upward and downward by links $I^2$, one at each end, pivoted to sliding blocks $I^3$, which move in vertical guides $i^3$ on the frame $a^5$ of the machine. These blocks $I^3$ are elevated by connecting-rods $I^4$, operated by a crank-pin $i^4$ of the gear-wheel $H'$ on each end of the machine. Consequently for each revolution of the gear-wheel $H'$ the bail rises and falls once. This movement of the bails is so timed relatively to the movement of the transfer-bar that the bail I' in its upward movement reaches a position just opposite the lowermost position of the arms D when the transfer-slide reaches a position in which the separating-way $e$ registers with the elevating-way G', and during the pause in the movement of the transfer-slide at this point the bail I' rises, striking any of the arms D which have been lowered, and thus carrying upward the plug-slides $d^2$ and forcing the balls in the separating-ways $e$ out of the transfer-bar and into the elevating-ways G'. Consequently as the elevating-way is already full, a number of tally-pieces equal to those forced out of the way $e$ are compelled to pass the spring-catches $g^3$ and to pass over through the connecting-way $g$ into the registering-way $G^2$. The bail I' at the same time raises all the depressed arms $C^2$ and returns the operated finger-plates C to their initial positions. During the movement of the return of the finger-plates the dogs $d^7$ are by the shape of the cam $d^{61}$ released from engagement with the segment-plates $D^2$.

Immediately back of the upper end of each storage-way G is a carrying-way $G^3$, (see Figs. 4, 7, and 8,) connected with the upper end of the storage-way by an aperture and passage $g^3$, and which carrying-way is connected with the registering-way $G^2$ by a way or passage $g^{30}$. Whenever the storage-way is full and more balls are forced into it at the bottom, the excess of balls will pass over into the carrying-way $G^3$ through the aperture $g^3$. On the back of the way-plate $G^5$ are pivoted a series of carrying-levers $G^{30}$, which close the ends of said carrying-ways, thereby preventing the emergence of the balls therefrom through the way $g^{30}$ into the registering-way $G^2$. Each of these carrying-levers $G^{30}$ bears a pin $G^{31}$, which extends through a slot in the way-plate $G^5$ adjacent to and on one side of each registering-way $G^2$. Opposite the position of said pin $G^{31}$ is another slot through the way-plate, in which moves a pin $G^{32}$. The pins $G^{32}$ are all attached to a bar $G^{33}$, extending transversely across the machine back of the way-plate and which moves transversely with each rotation of the shaft $E^3$. To the back of the way-plate is pivoted a lever $G^{35}$, which is connected to said bar $G^{33}$ and which is operated by a cam $G^{36}$ on the shaft $E^3$ to make one reciprocation of the bar with each rotation of the shaft $E^3$. The pins $G^{31}$ and $G^{32}$ are placed at such a distance above the line of division between the way-plate $G^5$ and the transfer-bar E that whenever ten balls have accumulated opposite the reading-scales $g^{20}$ on the way-plate the tenth ball comes between the said two pins, and the movement of the bar $G^{33}$ presses the pin $G^{32}$ against said tenth ball, which presses against the pin $G^{31}$ and thus rocks the lever $G^{30}$, to which said pin $G^{31}$ is attached. This lever $G^{30}$ controls the outlet from the carrying-way of the next higher denomination, and the motion of the pin $G^{32}$, which, through an interposed ball, moves the pin $G^{31}$ and its lever $G^{30}$, rocks said lever against the pressure of a spring $g^{29}$ just far enough to discharge one ball from the carrying-way $G^3$ into the registering-way $G^2$, with which said carrying-way is connected. At the same time the lever $G^{30}$ comes in contact with a latch $D^{30}$, pivoted on the transfer-bar E, which engages and supports an arm $D^{20}$, which is connected with a plug-slide $d^{21}$ in the transfer-way $e'$, which retains the balls in the registering-ways $G^2$. The latch is held in its normal position in the top of the transfer-way by a spring $d^{30}$. The motion of the lever $G^{30}$ just described compresses the spring $d^{30}$, unlatches the catch $D^{30}$, and allows the arm $D^{20}$ and its plug to fall, discharging the nine balls from that registering-way under the one which is pinched and held by the pins $G^{32}$ and $G^{31}$. The levers $G^{30}$ and the catches $D^{30}$ are held in normal position by suitable springs.

The carrying-levers $G^{30}$ close the ends of the carrying-ways $G^3$, but are recessed on the end, so as to hold one ball thereon, (see Fig. 4,) and their rocking movement closes the end of the carrying-way and releases said one ball from the way $G^3$ for passage through the way $g^{30}$ by the following mechanism: Pivoted to the back of the way-plate $G^5$ and adjacent to the outlet from each carrying-way is a bell-crank lever $g^{31}$, one end of which has a point which enters a slot $g^{32}$ into said carrying-way in position to stop the bottom ball in said carrying-way and retain it therein. The other end of said bell-crank lever is slotted, and a pin $g^{33}$ on the lever $G^{30}$ moves in said slot and rocks said bell-crank. Whenever the carrying-lever $G^{30}$ is rocked, the bottom ball in the carrying-way $G^3$ is cut off from the column above it, is pushed along by the end of the lever $G^{30}$, and is then released by the movement of the bell-crank lever $g^{31}$, said ball being at the same time moved to a point opposite the inner end of the passage $g^{30}$, through which it is discharged into the registering-way $G^2$.

The fifth and sixth systems of ways shown in Fig. 3, counting from the right-hand side, which register, respectively, the hundreds and thousands of units, are not provided with elevating-ways $G'$ in the way-plate $G^5$, nor with separating-ways $e$ in the transfer-bar E, but are provided with storage, carrying, and registering ways. The sixth way is provided with a carrying mechanism, such as hereinbefore described, in order to discharge the balls from the registering-way thereof when said way has reached its capacity and to reset the register to zero.

The resetting to zero is accomplished as follows: At one end of the case, as at K, Fig. 2, is a keyhole which connects with a bar $k$, situated behind the way-plate $G^5$ and borne by the laterally-sliding bar $G^{33}$. This bar can be turned by a suitable key, and by means of a tooth $k'$ thereon it reciprocates a second bar $k^2$ transversely with reference to the bar $G^{33}$. The bar $k^2$ carries a flat bar $k^3$, (see Fig. 6,) whose end is turned at right angles and passes through a slot $k^4$ in the way-plate $G^5$ and into a registering-way $G^2$. The bar $k^2$ has a series of shoulders $k^{20}$ upon it, to each of which is attached one of the bars $k^3$. When the bar $k^2$ is moved in the direction of the arrow in Fig. 3$^b$, it moves the bars $k^3$ and projects their ends into the respective registering-ways. At the same time the projections $k^{20}$ pass into position to engage with the transfer-levers $G^{30}$ and to move said transfer-levers to permit the passage of a ball from each carrying-way $G^3$ into each registering-way $G^2$. As the ball falls into said registering-way it is caught and held therein by the end of the bar $k^3$, provided the bar $k$ has been turned, as above described. If now the handle $H^4$ is turned, the balls are discharged from the registering-ways into the transfer-way and thence pass into the storage-way. At the same time one ball is discharged from the carrying-way into each registering-way and is held therein by the end of the bar $k^3$. As the ways in the transfer-plate can contain only nine balls and as two balls are always left in the bottoms of the registering-ways $G^2$, (see Fig. 6,) two turns of the crank are necessary in order to empty the registering-ways and the transfer-bar and obtain two balls from each carrying-way in order to raise the balls high enough. Consequently the handle is turned a second time and two balls are retained by the ends of the bars $k^3$ in the registering-way. The crank is then turned a little farther until the transfer-bar is shifted and closes the end of the registering-way, whereupon the key for operating the bar $k$ is turned to move the bar $k^2$ back to its original position, thereby moving the bars $k^3$ and allowing the two balls which had been sustained by each of them to fall into the bottom of the registering-way and to fill it up to such a point as to bring the remainder of the balls which might be let thereinto opposite the scale at the side. The bail I now lifts the plug-slides $d^{21}$ until their arms $D^{20}$ are caught and sustained by the latches $D^{30}$.

The indicating mechanism of this machine is of the rotary type and is adapted to be read at glazed openings Y, Y', $Y^2$, $Y^3$, and $Y^4$ at the front of the machine and at similar openings $y$, $y'$, $y^2$, $y^3$, and $y^4$ at the back of the machine. Upon suitable brackets $l^0$, attached to the back of the way-plate $G^5$, are set a series of pins $l\,l'$, to which are pivoted two series of indicator-wheels. The pins $l\,l'$ are set in the same horizontal plane, but out of line with each other, one set of pins $l'$ being all in one line, while the other set of pins $l$ are all in another line. The indicator-wheels are of uniform diameters, and consequently those wheels which are set upon the pins $l$ extend nearer to the back plate of the machine and adjacent to the openings $y\,y^4$, while the other set of indicator-wheels extend into slots or openings Y $Y^4$ in the way-plate $G^5$, as shown in Fig 8, and are adjacent to and visible through the front glass plate $a$ and through the openings $a^3$ in the front plate $A^3$. The wheel $L^2$, which is visible through the opening Y toward the right in Fig. 8, is the wheel which indicates the units. The next wheel $L^6$, which is visible through the opening Y', indicates dimes. The wheel $L^5$, which is visible through the opening $Y^2$, indicates dollars, and that L' which is visible through the opening $Y^3$ indicates tens of dollars, by which arrangement the numbers upon the wheels are read from left to right, as in ordinary numerical notation.

The wheels which are read through the openings at the back of the case are also arranged to be read as in ordinary numerical notation, and therefore the units must be read through the opening $y^3$, (see Fig. 8,) while the tens of dollars must be read through the opening $y$. Each of the wheels $L^2\,L^6\,L^5\,L'$, which is read through a front opening, has on its hub a pinion $l^2$. Above and below the indicator-wheels are shafts M M'. On the shaft M are sleeves $m'$ $m^3$, one within the other, each of which sleeves has a gear $n'$ $n^3$ upon each end of the sleeve. On the shaft M' are like sleeves $m$ $m^2$, having gears $n$ $n^2$. The gears $n$ mesh with pinions N, one of which is attached to the indicator-wheel $L^6$, indicating dollars, showing through the front opening Y', and the other to the indicator-wheel $L^7$, which is read through the rear opening $y^2$. The sleeve $m$ on which the pinions $n$ are fixed is set upon a sleeve $m^2$ and revolves around it. On the ends of the sleeve $m^2$ are the pinions $n^2$, which mesh with gear-wheels $N^2$, which are attached, respectively, to the front and rear reading indicator-wheels $L^2$ $L^3$, which indicate units, and the sleeve $m^2$ revolves upon the shaft M'. Upon the shaft M turns the sleeve $m^3$, having a pinion $n^3$ at each end thereof, which gears with a spur-wheel $N^3$, which is attached to the indicator-wheels L L', which indicate the tens of dollars. Upon the sleeve $m^3$ turns the sleeve $m'$, having a pinion $n'$ on each end thereof, which pinions mesh with spur-wheels N' upon the indicators $L^4$ $L^5$ reading "dimes." Thus if a pinion $l^2$ upon the hub of any one of the front indicator-wheels is turned the corresponding back indicator-wheel will be turned through the medium of the spur-wheels, sleeves, and gears just mentioned, and the numerical notation both at the front and back of the machine will be legible in correct order and arrangement. These indicator-wheels are moved by novel mechanism. Extending through the plate $G^5$ into the registering-ways $G^2$ are slots O, Fig. 3, extending from near the top of the ways downward therein a distance equal to the added diameters of over nine balls. In suitable guides $M^2$, (see Fig. 7,) attached to and supported by the plate $G^5$, are a series of vertically-moving racks $M^3$, which mesh with the pinions $l^2$, which operate the indicator-wheels. On the lower end of each of these racks is a weight $M^4$, which is sufficiently heavy to pull the said racks downward when free, and thus to rotate the connected indicator-wheels in the corresponding direction. To each one of the vertically-moving racks is pivoted an arm $M^5$, carrying on its upper end a hooked dog $M^6$, which dog extends through the slot O and into the registering-way $G^2$. If now balls are let into said registering-way and are held therein in a column opposite the said slot and if then the dog $M^6$ is allowed to pass through the slot and to fall, the dog will stop and rest upon the top ball in said column, and the weight $M^4$ will have pulled the rack $M^3$ downward and will thus have turned the indicator-wheels of corresponding denomination, and if the numerals or characters upon the indicator-wheel operated by the rack are at such a distance apart that a motion of the dog equal to the diameter of one ball will equal the interval between two numbers upon the indicator-wheel then the dog, when it rests upon the top of a column of, say, four balls, as shown in Fig. 7, will cause the display of the numeral "4" of the two corresponding indicator-wheels both at the front and back of the machine. The dog $M^6$ and its supporting-arm $M^5$ are normally pressed in a direction to pass through the slot O by a spring $M^7$, attached to the rack $M^3$. When the dog has moved nearly to the top of its path, a pin $m^6$ upon it comes in contact with a cam-surface $m^{60}$, Fig. 7, and is forced outward to the position shown in Fig. 6, leaving the registering-way $G^2$ free for the ingress of balls.

By the plate $G^5$ are supported also a series of bearings P, opposite and in line with the lower end of each slot O. These bearings are horizontal and bear a plunger P', which reciprocates longitudinally in the bearing and has a pin $p$ on the end thereof, which extends into the registering-way $G^2$ at the lower end of the slot. This pin $p$ supports a column of balls in the upper end of the registering-way for temporary indication and for determining the extent of rotation of the rotary indicator-wheels. Other bearings Q, parallel to the bearings P, contain plungers Q', which are normally pressed away from the plate $G^5$ by suitable springs $q$. The end of the plunger Q' is beveled, and so also is the rear end of the dog $M^6$. As the dog $M^6$ rises its beveled rear end passes the beveled front end of the plunger Q', and the dog $M^6$, being pressed backward by the cam $m^{60}$, hooks over the end of the plunger Q' and is thus sustained in its upper position. In this position of the parts the zeros are displayed by the numeral-indicator wheels and the blanks by the character-indicating wheels.

The rear ends of each two plungers P' and Q' are pivoted to an arm R, which extends downward below the plunger P' and has a forked lower end R'. The forks R' of all these arms R straddle a single bar S, which runs transversely across the machine behind the ball-plate $G^5$. This bar is supported by the arms S' at each end thereof, which arms are fixed upon a rock-shaft $S^2$, supported in suitable bearings in the frame $a^5$. This rock-shaft bears an arm $S^3$, which has a transverse pin $s^3$ upon it engaging with the cam-groove $s^4$ of a cam-wheel $S^4$ on the shaft $E^3$. As the shaft $E^3$ revolves the bar S rocks backward and forward and moves the plungers P' and Q' in manner following: The pin $p$, which extends into the registering-way $G^2$, has a shoulder $p'$ upon it, which presses against the lowermost ball Z, which rests on said pin $p$, and as the lever R rocks said ball is pressed by the shoulder $p'$ against the glass $a$ and forms a solid fulcrum for the movement of the arm R. This moves the lower end of the arm R toward the way-plate $G^5$ and, turning on the plunger P' as a fulcrum, pulls outward the plunger Q' against the stress of the spring $q$, thereby unlatching the end of the plunger Q' from the back of the dog $M^6$ and permitting the weight M⁴ to fall, drawing with it the dog M⁶ and rotating the pinion l², to which is attached the rack M³ belonging to that weight. It is noticeable that when there is no ball resting on the pin p the hook M⁶ will not be released and the indicator remains stationary.

The movement of a key and the operation of the handle H⁴ have resulted in forcing a number of balls, corresponding to the position of the key, over from the elevating-way G to the registering-way G². Let us say that four balls, as shown in Fig. 7, have thus been forced over. The normal position of the pin p retains said balls in the upper part of the registering-way, and on the revolution of the cam S⁴ the dog M⁶ is unlatched and descends until it strikes the topmost ball in said column of four, thus rotating its indicator to exhibit the figure "4" at the front and back of the machine. The four balls, the indicators, and the parts connected therewith remain in this position until the next operation of the machine, when the cam S⁴ moves the lower end of the arm R toward the back plate A⁴ of the machine, as shown in Fig. 7, and thus pulls out the plunger P', releases the balls in the registering-way G², and permits the weight M⁴ and dog M⁶ to descend, thus carrying the indicator to a stopping-point.

In the mechanism shown, the indicator being at zero, with the dog M⁶ latched in its highest position, when tally-pieces are forced over into the registering-way and held by the pin p the indicators immediately after the zero show their highest number, which is "9." As the weight M⁴ descends the numbers are shown in reverse order, "8," "7," &c., through the display-openings until a number corresponding to the number of balls (say four) held temporarily in the upper part of the registering-way is indicated. After the balls are released, as above described, from the indicating position the rotary indicators continue their revolution from a position such as shown in Fig. 7, showing "3," "2," and "1," and then are rotated backward from "1" to "9" and then to the zero-point. Thus each rotary indicator moves from the zero-point in one direction to a point at which the number corresponding to the actuation of the setting mechanism or key is exhibited and is there stopped and held. Then being released it continues rotation in the same direction until the whole series of numbers upon the indicator have been completed and have passed the reading-point, and finally is rotated backward to the zero-point and is held in this position ready for the succeeding operation.

In the operation of the machine shown the balls in the indicating position in the upper part of the registering-way are released very soon after the handle H⁴ of the machine begins to turn. The free fall of the weighted rack M³ quickly concludes the total possible revolution of an indicator in the same direction as its prior revolution toward indicating position, and the indicators then are moved back or rotated in the reverse direction to the zero position. It will be noticed that the operation of the indicators to indicating position to expose any character at an aperture or reading-point and then after release onward to the end of its possible rotation in that direction is effected by gravity and through the fall of the weight M⁴.

In order to return the indicators to zero, the racks M³ and weight M⁴ are lifted by a bail M⁸, which extends across the machine and comes in contact with each of said weights M⁴ or racks M³. This upper bail M⁸ is attached at each end to the block I³ and rises and falls therewith and with the bails I and I'. The bail M⁸ normally rests in a position a little below the lowest position of the weight and its stroke, and the size and proportion of the racks and pinions meshing therewith are such as to carry the indicators to zero by its full upward stroke.

The balls temporarily supported on a pin p are an indicator whose position or reading determines the position of the rotary indicator whose dog is sustained or stopped by said balls.

The finger-piece C on the extreme left in Fig. 3 and the indicator-wheels L⁹ and L¹⁰ are for indicating characterizing letters, words, or marks to show the character and origin of the particular transactions. For instance, the finger-piece and the indicators have upon them words, such as "No sale," "Paid out," "Received on account," "Charge," or contractions of these words, and letters, such as "A," "B," "C," &c., relating to a department of the business or to a particular clerk. By setting this finger-piece balls are lowered into the transfer-bar, are shifted under an elevating-way, and are then raised into said way, forcing a number of balls over through the channel g, to be caught and held by a point p. A hook M⁶ descends upon the top of the column of balls so held, and an indicator L¹⁰ is rotated to such an extent as to display through an opening Y⁴ in the way-plate G⁵ words or a character corresponding to the actuation of the finger-plate. No carrying or resetting mechanism is necessary in this apparatus, nor any storage-way; but in other respects this part of the machine is like the remainder of the systems in this register.

When the numeral-indicators display a zero, the corresponding indication of these indicators shows a blank surface.

A bell T or other means of alarm is operated at each opening of the drawer by means of a bell-hammer T', which is pivoted to the side of the case, as at t, and is normally drawn toward the bell by a spring t'. A stop t² prevents the hammer from quite striking the bell, but a spring-head T² permits the weighted end of the bell-hammer to continue movement and impinge against the bell notwithstanding the stop t². The hammer is lifted against the stress of the spring t' by means of a lug t³ on the shaft E³ and a bar t⁴, connected to said bell-hammer and set in the path of movement of the lug $t^3$, so that as the shaft revolves it lifts the bar $t^4$, and with it the hammer, but releases the same at a suitable position, permitting the hammer to strike against the bell.

This register contains a cash-drawer U, having on each side a projecting rail U', which runs upon friction-rollers $U^2$, attached to the inside of the drawer-casing A' of the machine. This cash-drawer contains a record-roll and its operating mechanism, which are hereinafter described, and is opened by a chain-and-pulley device and attaching mechanism. (Shown in Figs. 1, 2, and 11 to 16.) Immediately under the front middle portion of the drawer is a horizontal pulley $u$, which turns upon a pivot attached to the frame A or casing of the register. At the back of the register are two vertical pulleys $u'$, around which the chain or cord $U^3$ passes, the same moving horizontally and around the pulley $u$ and turning to a vertical position by passing around the pulleys $u'$. From these pulleys the chain passes around a large driving-pulley $U^4$, which is loose upon the shaft $E^3$. The chain $U^3$ is continuous and, as shown, passes twice around the pulley $U^4$, thence around the pulleys $u'$, and around the pulley $u$. The chain is fastened to the pulley $U^4$ by pins $U^{10}$ and cannot slip thereon. Attached to the interior of the drawer is a clip or fastener for attaching the drawer to the chain, as shown in Figs. 12, 13, and 14. On the chain is a double cone $u^2$, having the bases of the two cones adjacent to each other and having a narrow neck $u^3$ between said two bases. The ends of the cones are fastened to the ends of the chain. The clip has a pair of jaws $u^4$, provided with recesses which fit into the space between the bases of the two cones $u^2$ and fit around the neck $u^3$. These jaws slide up and down in a suitable casing, being operated by a finger-piece $u^5$ and at the same time move toward each other, so that when in their lowermost position they grasp the neck $u^3$, and when in their uppermost position they are drawn within the casing and have been opened to disengage from the chain. The dotted lines in Figs. 12 and 13 show the retracted positions and the full lines show the extended positions of the finger-piece and jaw.

The pulley $U^4$ has a flanged rim $U^5$, and on the inside of this flanged rim are two curved wedge-like cams $U^6$ and $U^7$, having their wide bases $u^6$ and $u^7$ directed toward each other and separated by a suitable space. Upon the shaft $E^3$ is a split collar $U^8$, which is firmly attached to the shaft and is adjustably clamped thereon by means of the set-screw $u^8$. This collar $U^8$ is provided with an arm $U^{80}$, which carries a pawl or dog $U^9$, which is pivoted to the arm by the screw $u^9$, adjacent to the periphery $U^5$ of the wheel $U^4$. The pawl has a point $u^{90}$, which is turned at right angles to the main portion thereof and extends within the rim $U^5$ of the wheel $U^4$, so as to be engaged by the ends $u^6$ and $u^7$ of the cams $U^6$ and $U^7$ when moving in the proper direction. The pawl is normally pushed in a direction toward engagement with said cams by means of a spring $u^{91}$, fastened to the arm $U^{80}$. The pawl also has a tail $u^{92}$, which is adapted to come into engagement with a stationary cam $u^{93}$, fastened by a suitable bracket $u^{94}$ to the back of the plate $G^5$. When the shaft $E^3$ revolves in the direction indicated by the arrows in Fig. 15, the pawl comes in contact with the end $u^7$ of the cam $U^7$ and propels the wheel $U^4$ in the same direction of revolution as the shaft $E^3$, thus opening the drawer. The rotation of the shaft $E^3$ continues until the arm $U^{80}$ reaches a position in which the tail $u^{92}$ of the pawl $U^9$ comes in contact with the cam $u^{93}$, whereupon the pawl is disengaged from the end $u^7$ of the cam $U^7$ and, moving in the direction of the arrow, (marked 1 in Fig. 15$^a$,) passes just over said end $u^7$ and stops. The cam $U^7$ at its thickest point is capable of passing the end $u^{90}$ of the pawl $U^9$ when the pawl is retained by the cam $u^{93}$; but the cam $U^6$ is thicker at its thickest point than the cam $U^7$, so that it will be engaged by said pawl whenever the pawl-arm or pulley revolves. The register is arranged to stop at this point with the drawer open. It is necessary to close the drawer before again operating the machine. While the drawer is closing the chain moves with it and causes the pulley $U^4$ to revolve in the direction indicated by the arrow (marked 2 in Fig. 15$^a$) until the cam $U^6$ passes over the now stationary pawl $U^9$ and the pawl snaps over the end $u^6$, at which point the drawer is completely closed and the parts are in the position shown in Fig. 15, ready for the next operation of the machine; but if an attempt should be made to open the drawer without operating the handle $H^4$ the chain connection would rotate the pulley in a direction opposite to that indicated by the arrow, (marked 2 in Fig. 15$^a$,) and this forces the end $u^6$ of the cam $U^6$ against the end $u^{90}$ of the pawl $U^9$, which tends to move the pawl-arm $U^{80}$ and to rotate the shaft $E^3$; but as the shaft is connected to the handle through the train of gears $H^2$ $H'$ $H$ and as the handle cannot rotate without being unlocked, as hereinafter described, the shaft, pawl, pulley, chain, and drawer are locked and cannot move.

In the drawings a means for locking the drawer is exhibited, which, however, is not of my invention. A pin 100 projects through the side of the casing into the line of movement of the crank in a position to stop the crank at the very end of the completion of its revolution. This pin is fastened on a plate 101, which is pivoted on the inside of the casing of the machine and is adapted to swing in a manner to move the pin out of the line of movement of the crank $H^4$. A push-button 102 is set on the outside of the case and has a stem 103 projecting through the casing and attached to the swinging plate. The operator takes hold of the handle, puts his thumb upon the push-button, and presses the same to take the pin out of line of movement of the crank, whereby the crank may be started and continued through its revolution.

It will be noticed that the drawer does not begin to move when the crank begins to move, but that there is a short interval between the beginning of the movement of the crank and the beginning of the movement of the drawer. Upon the side of the drawer is a metallic bar or rail 105, against which rests a pin 106, attached to the inner side of the plate 101. This pin 106, when the drawer is closed, may pass into a socket 107, extending into or through said rail. When the pin 106 goes into said socket, the pin 100 can move out of line of the crank, but if the drawer is open the pin 106 strikes against said rail and the plate 101 cannot move to take the pin 100 out of line of movement of the crank. Consequently when the handle has completed its revolution and is stopped by the pin 100 the handle $H^4$ cannot be rotated until the drawer U is closed and the socket 107 is in position to permit the pin 106 to enter thereinto and thus permit the pin 100 to move out of the line of the crank. As above noted, the pawl-arm $U^{30}$ of the chain-pulley $U^8$ moves forward through a small arc before the pawl engages with the flat end $u^7$ of one of the wedge-like cams $U^7$, and this interval of revolution and time is what permits the pin 106 to enter the socket 107 and to release the crank $H^4$ before the drawer can start. A suitable spring 108 operates the plate 101 to press the pin 100 and push-button 102 outwardly into their normal positions. It is impossible, therefore, to operate the machine unless the drawer is closed.

In the cash-drawer U are the record-roll and its mechanism. In a suitable frame V in the drawer are two reels or spools $V'$ $V^2$, called, respectively, the "storage-reel" and the "winding-reel." The storage-reel $V'$ holds a roll or web $V^0$ of paper, which is revoluble on the center-pin $v'$, fastened to the frame V, and a suitable brake, such as the spring $v^2$, also fastened to said frame, presses on the outside of said roll or web and so retards its rotation that it is fed off the storage-reel only to the extent of the pull on the web $V^0$ and without overrunning. Rigidly fastened to the frame V is the platen-support $V^3$, bearing on its upper surface the platen $V^{30}$, and adjustable to and from said line of print by the set-screws $v^3$. This platen when the drawer is fully closed is in position to receive a printing impression on the record-roll from a type-carrier, hereinafter described. It is also in such position in the drawer that the last imprint on the record-roll is exposed when the drawer is opened to the ordinary extent. The paper $V^0$ passes from the storage-reel $V'$ under and around the platen-support, (which has a smooth rounded surface in order to permit easy movement of the paper over it,) then over the platen $V^{30}$, and thence under a transparent plate $V^4$, fastened to the frame V, and over a guide $V^5$, to the winding-reel $V^2$. The winding-reel has an axle $V^{20}$, revoluble in a bearing on the frame V, and a barrel $v^{20}$, having a longitudinal peripheral notch in which the end of the web $V^0$ is fastened by a pin $v^{21}$. The axle $V^{20}$ is provided with a ratchet-wheel $V^{21}$, rigid therewith. On the axle $V^{20}$ is a pawl-plate $V^{22}$, capable of oscillating movement independent of the axle. The pawl-plate bears one or more pawls $V^{23}$, pivoted to the plate and engaging the ratchet-wheel $V^{21}$ when the pawl-plate is moved in the direction of the arrow in Fig. 10, but slipping back over the ratchet-teeth when the plate is moved in the opposite direction. The pawls are pressed toward the ratchet-wheel by springs $V^{24}$, and the pawl-plate is pulled by a spring $V^{25}$, fastened to the plate and to the frame V in a direction opposite to the said arrow. A spring $v^{121}$, fastened to said frame, presses against the periphery of the ratchet-wheel in order to prevent overthrow or reverse rotation thereof. To the pawl-plate is pivoted a lever $V^{26}$, extending through the bottom of the drawer $v$, and rests against a pin $v^{26}$ on said plate when the lower end of the lever is moved toward the right in Fig. 10, and thus may move the pawl-plate in the direction of the arrow; but if the lever is moved toward the left in Fig. 10 it moves away from the pin and does not affect the pawl-plate.

On the inside of the casing of the register is fastened a lug $V^{27}$ in the path of movement of the lever $V^{26}$. If now the drawer U is moved toward the left in Fig. 10, the lever $V^{26}$ comes in contact with the lug $V^{27}$, and the winding-reel is turned to feed the web of paper. On the return movement of the drawer the lever slips over the lug, and the winding-reel is not affected. It is to be noticed that by a movement toward the left in Fig. 10 the drawer is opened. Hence the opening of the drawer causes a feeding of the record-roll. An independent feeding device is also provided which is operative when the drawer is not opened. On the side of the drawer is pivoted a bell-crank lever $V^{28}$, connected by a link $v^{28}$ to the pawl-plate. If the bell-crank is reciprocated, the pawl-plate moves and winds the web on the barrel $v^2$. This bell-crank is actuated by a rod 8, which is actuated whenever the handle $H^4$ is turned, and hence the record-roll is fed onward whether the drawer is detached from the chain $U^3$ or not.

Each finger-piece C, provided with its arms $C'$ and $C^2$ and with its segment-plate $D^2$, is fastened on a sleeve. The units finger-plate is set on one end of a sleeve $C^{0'}$, which fits and turns on the shaft B. Immediately outside of the sleeve $C^{0'}$ is another shorter sleeve $C^{02}$, bearing on one end the dimes finger-plate. Outside of the sleeve $C^{02}$ is a still shorter sleeve $C^{04}$, bearing on one end the tens-of-dollars finger-plate. The other end of each sleeve has clamped upon it an arm $C^{10}$ $C^{11}$ $C^{12}$ $C^{13}$, which is coupled to a connecting-rod $C^{20}$ $C^{21}$ $C^{22}$ $C^{23}$.

These connecting-rods are coupled to arms $C^{30}$, $C^{31}$, $C^{32}$, and $C^{33}$, fastened to the ends of sleeves $C^{40}$, $C^{41}$, $C^{42}$, and $C^{43}$, arranged on a supporting-shaft $C^{X}$ at the back of the machine. The sleeves $C^{40}$, &c., extend through the casing of the main part of the machine and are provided on their other ends with arms $C^{50}$ $C^{51}$ $C^{52}$ $C^{53}$ for connection with type-setting devices, such as type-bars, hereinafter explained.

The arms of the sets $C^{10}$, $C^{30}$, and $C^{50}$ are equal in length and are all parallel, so that movements of finger-plates produce proportionate movements of the arms $C^{50}$, and consequently of the type-setting bars $C^{70}$. The units finger-piece is connected to the inside sleeve $C^{0}$ and to the outside sleeve $C^{40}$ of the set $C^{40}$ to $C^{43}$, while the tens-of-dollars finger-plate is connected to the outside sleeve $C^{03}$ and to the inside sleeve $C^{43}$, the purpose and result of this arrangement being that the numerical order of the finger-plates and of the type-bars are relatively reversed, so that imprint from the type-bars shall occur in proper order.

The type-bars are shown in Figs. 20 to 24. A connecting-link $C^{60}$, $C^{61}$, $C^{62}$, $C^{63}$, and $C^{64}$ connects, respectively, the arms $C^{50}$, $C^{51}$, $C^{52}$, $C^{53}$, and $C^{54}$ with type-setting devices consisting of type-bars or type-carriers $C^{70}$, $C^{71}$, $C^{72}$, $C^{73}$, and $C^{74}$. Each of these type-carriers (see Fig. 20) is a rectangular bar having a central slot $c^{70}$. On the upper and lower faces of these bars are type $C^{80}$ $C^{81}$, corresponding to the numerals or characters on the finger-plates to which any bar is connected and so arranged that the setting of a finger-plate to a numeral or characterizing-mark brings to the printing positions the corresponding type. Each numeral-bar has also a zero-type upon it in position to print when the bar is unmoved. For instance, as indicated by the dotted lines in Fig. 21, the bar $C^{72}$ (or tens-bar) is moved to the end of its possible play and is in position to print a "9," while the bars, being unmoved, are shown in position to print zeros.

The foregoing finger-plates and connected parts relate to the computing mechanism. The finger-plate on the extreme left in Fig. 3 is for characterizing letters or words and has an arm $C^{14}$, connecting-rod $C^{24}$, arm $C^{34}$, sleeve $C^{44}$, arm $C^{54}$, link $C^{64}$, and type-bar $C^{74}$.

The printing mechanism is set in a case $X^{70}$ at the left-hand side of the machine, as shown in Fig. 1. Above the casing $X^{70}$ is a casing $X^{71}$ for holding a roll or web $X^{72}$ of check-paper, which passes into the printing devices through an aperture $X^{73}$ in said casing. It includes mechanism for printing checks on a continuous web and for cutting them off in proper uniform lengths. In the cash-drawer of the register is the record-roll, above described, having its platen $V^{3}$ in position to receive printing upon the web $v^{0}$ from the type-bars $C^{70}$ $C^{74}$. The plate $A^{5}$ is open above the record-roll, so as to permit the type-bars to swing downward through it to make their printing impressions on said roll.

The end of the shaft $E^{3}$ extends through the side casing $A^{2}$ of the register and is removably coupled in any suitable manner to the main driving-shaft 2 of the printer, as by the clutch-like notches 3, Figs. 17 and 18. The shaft 2 bears a gear-wheel 4 on one end and is supported by the printer-frame 1. On the other end of the driving-shaft is a crank 5. On the same side of the printer-frame as said crank is pivoted a lever 6, (see Fig. 19,) which extends between the crank 5 and the printer-frame 1. On the inner side of the crank is a pin 7, which, as the crank revolves, presses upon the lever 6 and depresses it. The free or movable end of the lever rests upon a vertical rod 8 set in guides in the printer-frame 1 and pressed normally upward by a spring 9. The lower end of the rod 8 rests on and actuates the feed mechanism of the record-roll, (see Fig. 10,) whereby at every turn of the handle $H^{4}$, and consequently of the driving-shaft 2, the record-strip $V^{0}$ is advanced one space, so as to present a new space on the platen $V^{3}$ for the imprint, and when the pin 7 moves out of position to actuate the lever 6 the spring 9 raises the rod 8 to its normal or vertical position again, carrying the lever with it. The type-bars $C^{70}$ to $C^{74}$ are set side by side in a frame 10, pivoted at the rear end to the frame 1 by the horizontal pivots or screws 11. A bar 12 extends transversely across above the frame and is fastened to the sides thereof by the plates 13. Across the printer-frame 1 and above the position of the bar 12 is a shaft 15, bearing face-cams 16 and 17 on both ends, having cam-grooves 18, (see dotted lines in Figs. 19 and 21,) in which rest the ends 14 14 of the bar 12. The cam-grooves are so shaped as to rock the frame 10 on its pivots 11, with the type-bars, so far downward as to make a printing impression against the record-roll platen $V^{3}$ and then to raise the frame and make a printing impression against an upper check-platen, which will be described later. The cam 17 has gear-teeth cut on its periphery (see Figs. 17 and 18) and is driven from the driving-shaft 2 by a train of gears 4 4' $4^{2}$, Fig. 18, and thus both the cams 16 and 17 are driven together in time and move the frame 10 equally on both sides.

Across the frame 10 are bars 19 and 20, which fit in the slots $c^{70}$ of the type-bars and form guides for said type-bars. (See Fig. 20.) In order to ink the type on the type-bars of the printing-line, a pair of inking-pads 22 extend transversely across the whole set of type-bars. These pads are borne by plates 23, pivoted at 24 to side plates 27. These plates 23 have extensions 25 on the opposite sides of the pivots from the pads, and these extensions are normally pressed from each other by springs 26, whereby the pads are brought together. Between the frame and the type-bars $C^{70}$ $C^{74}$ are two sliding plates 27 and 27', (see Figs. 22 and 23,) fastened together by the transverse bar 21, moving in the slots $C^{70}$ of the type-bars and between the bars 19 and 20. To a pin $27^2$ on the rear end of each of the said sliding plates 27 and 27' is attached one end of a coiled spring 28, the other end of which is attached to a pin 10' on the frame 10 and tends, when stretched, to extend said sliding plates outwardly to the dotted-line positions of Figs. 21 and 22. The ink-pad plates 23 have side pins 23', which rest on the upper and lower edges of the frame 10 and when so resting press the inking-pads 22 away from each other, compressing the springs 26; but on the edges of the frame 10 are notches $10^2$, into which the pins 23' drop when the pads are in position (see full lines, Fig. 22) to ink the type $C^{80}$ and $C^{81}$ on the type-bars and on the transverse line or row of type which are to make the printing impressions on the record-roll and check platens.

On the shaft 15, outside the cam gear-wheel 17, is another smaller gear-wheel 29, bearing a pin 30, which as it revolves engages a hook 31 on a lever 32, connected to a stud 34 on one of the plates 27' by a link 33, (shown adjustable,) Fig. 18. In the form shown the pivotal point 32' of the lever 32 is on the end of the hub of a gear-wheel, but rocks freely independently of the revolution of said hub. The normal position of rest is shown in Fig. 18, the pin 30 being in engagement with the hook 31 and having drawn back the plates 27 and 27' and having thus put the springs 28 under maximum tension. When the gear-wheel 29 begins to revolve in the direction of its arrow, the pin 30 immediately releases the lever 32, and the springs 28 cause the plates 27 and 27' to fly out into the dotted-line position in Figs. 21 and 22, and as the plates fly out the pins 23' ride up on the edges of the frame 10, and thus the pads quickly separate and move out of way of the movement of the type-bars. As the wheel 29 still revolves, the pin again makes contact with the hook and pulls the plates 27 and 27' back to initial position. The notches $10^2$ are so placed with reference to the revolution of the handle $H^4$, which drives the whole mechanism, that the pads ink the type on the printing-line immediately after the type-bars are set and the handle begins to actuate the mechanism. The pads in the position of rest of the machine rest close to the type, but out of contact with them, for otherwise they would clamp the type-bars and interfere with free setting of the type. The spring and trigger-like mechanism (hook 31 and pin 30) carry the pads immediately out of the way, and the type-bars may swing to make their impressions.

Within the printer-frame 1 is a stationary platen 40, adjustable as to position by means of the set-screws 41, passing through lugs 42 into the platen-frame. Between the platen is a curved plate 43, provided with a second platen 44, against which the type-bars $C^{70}$ to $C^{74}$ are pressed. These two platens and the plate 43 are carried by a platen-frame 45, fastened to slides 46, moving in vertical guides 47 in the frame 1. These slides are movable by a transverse shaft 48, having a handle 49 and eccentric end bearings 50, journaled in the printer-frame 1. The shaft 48 turns in slots 51 in the sides of the platen-frame 45, so set as to raise and lower the platen-frame by turning the handle and thus remove the platens from positions where they can be impressed by their respective printing mechanisms. Hence in one position of the handle 49 printing will occur; but in the other position thereof no printing will take place. A guide-plate 43', parallel and close to the face of the platens and to the curved plate 43, guides the web $X^{72}$ and retains it in position.

Within the frame 1 is hung a vibrating type-carrier 52, which is suitably journaled in the frame, as on the shaft 15, so as to rock to and from the platen 40. This type-carrier bears the dating mechanism and the consecutive-numbering mechanism for the check. In the form of device shown both of these devices are of well-known forms.

The dating device has three wheels 53, one bearing type to print the name of the month and the others bearing type for printing the number of the day of the month. These wheels may be set by hand by the wheels 54, 55, and 56, Figs. 17 and 19.

The consecutive-numbering device consists of a proper set of printing-wheels 57, journaled in the frame 52. A swinging pawl-carrier 58, bearing a pawl 59, engages the units-wheel of the set 57. A link 60, pivoted at one end to said pawl-carrier and at the other to the frame 1, vibrates the pawl-carrier once for each vibration of the frame 52 and changes the units-wheel of the set 57. The set of wheels 57 are provided with devices for transferring or carrying from lower to higher denominations, as usual. A spring-dog 57' holds each of the printing-wheels of the set 57 to prevent overthrowing or motion after the wheel is set by either the forward or backward motion of the pawl 59.

The crank 5 on the driving-shaft 2 carries a link 61, connected to a crank 62 on a second shaft 63, which last bears an arm 64, terminating in a friction-roller 64'. The friction-roller engages the surface 52' of the frame 52, and as the arm 64 rocks downward in the direction of the arrow (marked $x$ in Fig. 20) the frame 52 turns on its bearing 15 and falls away from the platen 40. As the arm 64 rocks back to the position shown in Fig. 20 the frame 52 is lifted backward toward the platen and is forced against it by the toggle-like action of the arm 64 to make the printing impression. As will be seen from Fig. 20, the cam-surface 52' is so formed as to produce this printing impression at the end of the return stroke of the arm 64. The dating and consecutive-numbering wheels are inked by a pad 65, set on a frame 65', which latter is journaled at $65^2$ near to the frame 52. The pad-frame 65' rests on the end 52' of the frame 52, and as the latter is lowered by the motion of the rock-arm 64 the pad drops on the type of the sets of wheels 53 and 57. As the frame 52 returns to place the pad-frame 65' is moved back to the position shown in Fig. 20, out of the path of said printing-frame 52. An inking-roller may of course be substituted for the pad and pad-frame and may be actuated by any mechanism such as is well known in printing-presses.

The platen-frame 45 carries a roller 66, which is driven by a gear-wheel 67, which last is driven from the main shaft 2 by the train of gears 4 4' $4^2$ 17 29, so as to revolve with the main shaft throughout its rotation. This roller 66 has a raised portion 66' on less than half of its periphery, which raised portion may or may not be a printing-plate, such as an electrotype. Fastened to the frame 1, adjacent to the end of the curved paper-support 43, is a roller 68, having bearings 68', parallel to the axis of the roller 66 and set in a frame $68^2$, adjustable with reference to the roller 66, both for proximity and for parallelism, by means of suitable set-screws or bolts $68^3$. The roller 68 guides the paper check-strip $X^{72}$ close to the roller 66, so that when the raised portion 66' revolves past the nearest portion of the roller 68 the check-strip will be fed forward, and if the raised portion 66' is a printing-plate the back of the check-strip receives an impression therefrom. The roller 68 may revolve freely or may be driven from the gear-wheel 67 by a gear-wheel $68^4$ on its axis 68'.

In the frame 45 is journaled an inking-roller 69 for inking the raised printing-plate 66'. Adjusting-screws 69' serve to regulate the position of the inking-roller with reference to the plate 66'.

In the line of delivery of the check-strip is a pair of shear-blades 70 71, one of which, 70, is stationary. The other, 71, is movable and is pivoted at one end, as at 71', to the frame 1. The other or free end of the blade 71 is set in the yoke end 72' of one arm of a lever 72, pivoted at $72^2$ to the frame 1. Another arm $72^3$ of said lever bears a hook $72^4$, which is engaged by a pin 16' on the back of the cam 16, and which, as shown in Fig. 19, operates to close said shear-blades and cut off the proper length from the end of the check-strip $X^{72}$. The arm $72^3$ has an extension $72^5$, which straddles the shaft 15 and has an end $72^6$ inturned toward the cam 16. A pin $16^2$ on said cam (so short as to pass under the hook $72^4$ without engaging it) engages the end $72^6$ and serves to open the shears by moving the blade 71 away from the stationary blade 70. Since the cam 16 revolves once for each revolution of the main shaft 2, the shears cut off one check for each such revolution.

When the machine is at rest, the indicators, ball and rotary, exhibit the amount, &c., of the last transaction.

Having closed the drawer, the first operation in the use of this machine is to set the finger-pieces to correspond to the operation in hand. This setting movement sets the printing-bars and permits a number of balls corresponding to the numbers, &c., to which the finger-pieces are set to descend from the storage-ways into the separating-ways for transfer to the elevating-ways. All the other operations of the machine are produced by the revolution of the crank.

During the first one-eighth revolution of the crank the following operations occur: The dog $d^7$ is thrown into the toothed segment $D^2$, which locks the finger-pieces C, the indicating-balls $z$ are released from the upper part of the registering-ways, and the rotary indicators drop to the position 1. The balls representing the last sale fall into the registering-ways adjacent to the register-scales $g^{20}$, thus adding the amount represented by said balls to the amount represented by the balls previously adjacent to the register-scales. Just before the end of the first one-eighth movement of the crank the transfer-bar E begins to move. The upper bail $M^8$ (by which the indicators are returned) has not, when the handle is at normal, quite finished its downward stroke; but during said one-eighth movement of the crank it finishes this stroke. In the printer the pin 30, acting on the hook 31 and the lever 32, completes the return movement of side pieces 27, and during such movement the pins of the inking-pad arms, actuated by their springs, slip off the cam-surfaces into the notches and the inking-pads close upon the type-bars at the printing-line, thereby inking the type. As soon as the type are thus inked the pin releases the hook of the lever 32 and the springs 28 drive the side pieces 27 forward, carrying with them the inking-pads out of the way of the swinging movement of the type-bars. During the latter part of this movement of the crank the type-bars swing downward and print upon the record-roll $V^0$ on its platen $V^3$. The pawl-arm $U^{30}$ of the drawer-opening mechanism begins to move forward to bring the pawl $U^9$ into engagement with the square end of the wedge-cam $U^7$.

During the second eighth of the revolution of the crank the following operations occur: The transfer-bar E completes its movement in one direction and the bails begin to rise. During this one-eighth the dog $d^7$ remains in the teeth of the toothed segment $D^2$, holding the finger-plates C and their connections through to the type-bars immovable. In the printer the inking-pad 65 begins to travel downward to meet the dating and consecutive-number wheels, while the frame 52, carrying the said dating and consecutive-number wheels, is traveling backward away from the platen 40 in order to give space for the operation of the inking-pad. The shears complete their opening movement, and before any feeding of the check-strip occurs the type-bars have moved upward toward the platen 44 and imprinted upon the face of the check-strip the amount, &c., of the particular transaction.

During the third eighth of the revolution of the crank the following operations occur: The bails I I' have now come in contact with the arms D D$^{20}$ of the plug-slides $d^2$ $d^{21}$ and begin the operation of raising all the balls in the transfer-slide E, and consequently of returning the finger-plates C to place. By this same operation the balls are forced over from the elevating-way G' into the top of the registering-way G$^2$ to be held there by the pins $p$, both for a temporary indication and to determine the extent of the rotation of the rotary indicators. At the end of this first eighth movement of the crank the pawl-arm U$^9$ of the drawer-operating mechanism has come in contact with the square end $u^7$ of the wedge-cam and has begun to rotate the pulley and to move the chain attached to the drawer to force the drawer open. The upper bail M$^8$ comes in contact with the weights M$^4$ upon the vertical racks $m^3$ and begins to return the indicators to zero. During this eighth the locking-dogs $d^7$ are released from the toothed segments D$^2$, in order that the finger-pieces may begin their return to place, but the transfer-bar remains stationary. In the printer the frame 52, bearing the dating and consecutive-number wheels, finishes its stroke away from the platen, and the inking-pad 65 completes inking the surface of said wheels. The extra printing and feeding wheel 66 for printing on the back of the check reaches a point at which it begins to feed the check forward through the shears 70 71. The operation of returning the finger-pieces by the rise of the bails begins to return the type-bars C$^{70}$ C$^{74}$ with the finger-pieces, because the same are connected.

During the fourth eighth of the revolution of the crank the following operations occur: The locking-dogs remain disengaged from the toothed segments. The lower bails continue to rise, forcing balls over from the elevating-way into the registering-way, lifting balls from the separating-ways $e'$ into the storage-ways G and returning the finger-plates to place, and the upper bail continues the return of the indicators toward zero. The opening of the drawer continues, and thereby the lever V$^{26}$, depending through the bottom of the drawer, comes in contact with the lug V$^{27}$ on the frame A and causes the feeding of the record-strip V$^0$ forward one space. Of course the transfer-bar remains stationary while the balls are being elevated from out of it into the way-plate G$^5$. In the printer the extra printing-roll 66 continues its revolution and continues the forward feeding of the check-strip X$^{72}$. The inking-pad 65 for inking the dating and consecutive-number wheels begins its return stroke, and at the same time the frame 52, bearing said consecutive-number and dating wheels, begins its movement toward the platen 40.

During the fifth eighth of the revolution of the crank the following operations occur: The locking-dogs remain disengaged from the toothed segments, which hold the finger-pieces. The motion of the lower bail continues, bringing the bails to their highest positions just at the end of this one-eighth, thereby lifting all the balls which have been lowered into the transfer-bar out of it and into the various ways of the way-plate and returning the finger-plates, plug-slides, and type-bars to their initial positions. Just at the conclusion of this movement the dogs M$^6$, attached to the indicator-racks M$^3$, strike their stationary cams $m^{60}$ and are withdrawn from the grooves O, leading into the registering-ways, and the weights M$^4$ and racks M$^3$ are lifted to their highest points by the upper bail. The rotary indicators then latch with the indicators returned to zero. In the printer the feeding of the check-strip continues. The inking-pad 65 withdraws from its inking position, and the dating and consecutive-number wheels in their frame continue to move toward the platen.

In the sixth eighth of the revolution of the crank the following operations occur: The locking-dogs become engaged with the segments, holding the finger-plates stationary. The transfer-bar begins its return movement. The drawer continues its opening motion. The carrying-bar G$^{33}$ begins its movement to pinch and hold the tenth accumulated ball in any registering-way, and where any carrying is to occur the balls are discharged from the carrying-ways G$^3$ and rest on the ball so pinched or upon the balls which may be above it. In the printer the inking-pad 65 is returned fully to its initial position. The dating and consecutive-number wheels move close up to the platen 40, ready to make a printing impression. The extra printing-roll 66 still revolves and concludes the feeding of the check between the shears.

During the seventh eighth of the revolution of the crank the following operations occur: The transfer-bar returns to its initial position just after this movement of the crank begins, and if in any column more than nine balls have accumulated, and thus balls have been pinched by the carrying-bar, the latches D$^{30}$ of the rear plug-slides $d^{21}$ release the slides in such column and permit the slides to fall. When the transfer-bar reaches its limit, ten of the balls under the pinched ball (being the full number which the pocket can contain) drop out of the registering-ways into the separating-ways $e'$ of the transfer-bar, leaving the pinched ball and those balls above it which are supported by the clamping action of the carrying-bar. The bails are all moving downward for return to their initial position. The locking-dog holds the toothed segment stationary. The drawer continues to open. In the printer the extra printing-roll disengages from the check-strip and the check-feed is finished. The pin 7 upon the crank 5 acts on the lever 6, which presses the rod 8 against the tension of its spring, and if the drawer is disengaged from its operating mechanism and is in its fully-retracted position the rod 8 presses against the bell-crank $V^{28}$ and causes a feed of the record-roll $V^0$. The dating and numbering wheels move close up to the platen 40, ready to print upon the check-strip.

In the eighth eighth of the revolution of the crank the following operations occur: The locking-dogs remain engaged with the toothed segments and hold the finger-plates stationary. The movement of the drawer is finished. The pawl $U^9$ is released from the square end $u^7$ of the wedge-like cam $U^7$ by the action of the stationary cam $u^{93}$ and slips over said end and along the wedge-like cam, thereby disengaging the pawl-arm from the pulley $U^4$. The indicator-racks $M^3$ are unlatched and the dogs $M^6$, operated by their springs $M^7$, project through the slots O into the registering-ways, permitting said dogs to descend therein until they rest upon the top ball of each indicating-column of balls supported by the pins $p$ in the upper portions of each registering-way, whereby the rotary indicators exhibit numbers corresponding to the numbers of the balls in said ways. The carrying-bar $G^{33}$ returns to place, and the balls pinched thereby and those resting upon the pinched ball fall into the lower portions of the registering-ways adjacent to the reading-scales $g^{20}$. The bails all return to initial position, leaving the balls indicating the last operation in the upper ends of the registering-ways adjacent to the scales $g^2$ and with the hooks $M^6$ connected to the indicator-racks $M^3$ resting upon them, and thus the rotary indicators exhibit the same amount as said indicating-balls. In the printer the shears cut off a length from the end of the check-strip equal to the amount of feed, and said check is delivered through an opening $X^{74}$ in the casing $X^{70}$ of the printing mechanism. The printing impression of the dating and consecutive-number wheels is made during this last movement of the crank, and the impression is made on a portion of the check-strip which is distant the length of several checks—as, for instance, in the present case three—from the end of said strip. Hence there are always three checks in process of printing, the operation on the first check being the printing of the date and consecutive numbering. There is no printing on the second check. The operation on the third check is the printing on the check of the amount of the particular transaction shown by the indicators and the printing upon the back of the check whatever may have been set in type upon the additional printing-wheel 66. The third check is then cut off and delivered from the machine. The dating and consecutive-numbering wheels are relieved from the check-strip immediately after the printing impression occurs and before the completion of this last eighth of the revolution of the crank. The revolution of the gear-wheel bearing the pin 30 engages, during this eighth of the crank-revolutions, with the hook of the lever 32 and pulls the plates 27 and 27' backward, putting their springs 28 under tension, until the plates are nearly at their extreme backward position, but not so far as to permit the inking-pads to rest upon the type on the type-bars. As above set forth, the first eighth of the revolution of the crank completes the backward motion of said plates and permits the inking-pads to press upon the type at the printing-line.

The foregoing states the complete cycle of the operations of this machine, except as to the returning of the drawer, which must be performed by the operator and is necessary in order to permit further movement of the crank.

It will be noticed that the check-strip is fed in one direction while the record-strip is fed in the other direction, and that the check-strip platen and the record-roll platen are opposite each other, so that the type of each pair for printing the same character, whether numerals or characterizing-marks, are opposite each other on opposite sides of the bars, but that the type of each pair are reversed with reference to each other in order to print in proper order on the check-strip and on the record-roll.

The record-roll is visible whenever the drawer is opened, and the record-roll is fed to provide a new printing-surface whether the drawer is opened or is disconnected from the opening mechanism and remains shut. It is also to be noticed that the drawer is held in the closed position without a locking device for the handle $H^4$, for in order to open the drawer without turning the handle the chain and pulley must rotate the pawl-arm, the shaft $E^3$, the gearing $H$ $H'$ $H^2$, and, in fact, the whole mechanism of the machine; but this could not be done without using too great power.

I claim—

1. In a cash-register, the combination of a setting mechanism, an indicator-plate having a series of characters thereon, means for moving said indicator-plate to display said characters successively at a reading-point, mechanism for stopping said indicator-plate at different points corresponding to the actuation of the setting mechanism, means for releasing said indicator to permit said plate to continue its motion in the same direction until the remainder of the characters have passed said reading-point, and means for moving said indicator-plate in the opposite direction to return the same to zero.

2. In a cash-register, the combination of a setting mechanism, an indicator having a series of characters thereon, said indicator being movable by gravity to indicating position to display the characters successively at a reading-point, means for stopping said indicator to expose the character corresponding to the actuation of the setting mechanism, means for releasing the indicator whereby its motion is continued in the same direction until the series of characters have passed said aperture, and means for returning said indicator to zero.

3. In a cash-register, the combination of a setting mechanism, an indicator-wheel bearing on its periphery a series of characters adapted to be successively displayed at an aperture, means for rotating said indicator in one direction to expose said numbers successively at said aperture, means for stopping the rotation of said indicator at different points corresponding to the actuation of the setting mechanism, means for releasing said indicator whereby its rotation continues in the same direction until the whole series of characters have passed said aperture, and means for rotating said indicator in the opposite direction to return the same to zero.

4. In a cash-register, the combination of a setting mechanism, an indicator-wheel having a series of numbers on the periphery thereof, a pinion on the shaft thereof, a rack engaging said pinion, means for moving said rack in one direction to successively expose the numbers on said indicator at an aperture, devices for stopping said rack at different points corresponding to the actuation of the setting mechanism, means for releasing said indicator whereby the remainder of said series of numbers are caused to pass said aperture, and means for rotating said indicator in the opposite direction to return the same to zero.

5. In a cash-register, a rotary indicator having a series of numbers or characters upon its periphery, a pinion upon the shaft of said indicator, a weighted rack moving in substantially vertical guides and meshing with said pinion, a catch for holding said rack in its highest position, a setting mechanism, devices for stopping said rack at different points in its downward motion corresponding to the actuation of the setting mechanism, means for releasing said rack whereby it may continue its downward motion to its limit, and means for raising said racks for returning the indicator to zero.

6. In a cash-register, the combination of a guideway for a series of tally-pieces, means for separating in said series different numbers of tally-pieces as desired, means for moving said tally-pieces in said guideway, means for temporarily retaining in said guideway the number of tally-pieces so separated, an indicator-plate having a series of characters thereon, means for moving said indicator-plate to expose said characters successively at an aperture, means connected to said indicator-plate and adapted to engage said retained tally-pieces to stop the motion of the indicator to display a number corresponding to the number of said retained tally-pieces, means for releasing the tally-pieces so temporarily retained and thereby releasing the indicator and permitting the same to continue its travel, and means for returning the indicator to zero.

7. In a cash-register, a guideway for a series of tally-pieces, a setting mechanism for separating in said series, different numbers of tally-pieces as desired, means for temporarily retaining in said guideway the number of tally-pieces so separated, a rotary indicator, actuating means for rotating the same in one direction, devices connected with said actuating means for stopping the indicator at different points corresponding to the number of tally-pieces so temporarily retained, means for releasing said tally-pieces and thereby permitting the indicator to continue its revolution in said direction, and means for rotating the indicator in the other direction to return the same to zero.

8. In a cash-register, the combination of a guideway for a series of tally-pieces, means for separating in said series different numbers of tally-pieces as desired, means for moving said tally-pieces in said guideway, means for temporarily retaining in said guideway the number of tally-pieces so separated, a rotary indicator having a series of characters thereon adapted to pass a reading-aperture, means for rotating said indicator in one direction to expose said characters at said aperture in inverse order, means connected to said indicator and adapted to make contact with the top of the column of tally-pieces so temporarily retained for stopping said indicator to expose a character corresponding to the number of retained tally-pieces, means for releasing said tally-pieces and thereby permitting the indicator to continue its rotation, and means for rotating the indicator in the other direction to return it to zero.

9. In a cash-register, a guideway for a series of tally-pieces, means for moving said tally-pieces in said guideway, setting mechanism for separating in said series different numbers of tally-pieces as desired, devices for temporarily retaining in said guideway the number of tally-pieces so separated, a bar movable into and out of said guideway and adapted in its movement in one direction to make contact with the top of the column of tally-pieces temporarily retained in said guideway, a movable indicator, means for moving said indicator in one direction and connections to said bar, devices for releasing said tally-pieces so temporarily retained and thereby permitting the indicator to continue its movement in said direction, and means for moving the indicator in the other direction to return the same to zero.

10. In a cash-register, the combination of a guideway for a series of tally-pieces, a setting mechanism for separating in said series different numbers of tally-pieces as desired, a mechanism for moving said tally-pieces in said guideway, means for temporarily retaining in said guideway the number of tally-pieces so separated, a bar movable into and out of said guideway and adapted in its movement in one direction to make contact with the top of the column of tally-pieces so temporarily retained in said guideway, a rotary indicator, mechanism for rotating said indicator and connections to said bar, means for releasing said tally-pieces so temporarily retained and thereby releasing the indicator and permitting the same to continue its rotation, means for returning the indicator to zero, and a single operating mechanism for actuating the means for moving the tally-pieces and the means for returning the indicator to zero.

11. In a cash-register, the combination of a guideway for a series of tally-pieces, a setting mechanism for separating in said series different numbers of tally-pieces as desired, means for temporarily retaining in said guideway the number of tally-pieces so separated, a rotary indicator, a pinion on its axle, a rack engaging said pinion, means for moving said rack in one direction to successively expose the numbers on said indicator at an aperture, a bar connected with said rack movable into and out of said guideway and adapted to make contact with the top of the column of tally-pieces so temporarily retained in said guideway whereby a number on said indicator is exposed which corresponds to the number of tally-pieces so temporarily retained, means for releasing said tally-pieces so temporarily retained and thereby permitting the rack to cause the indicator to revolve in the same direction to the end of the movement of the rack, and means for moving said rack in the other direction to return the indicator to zero.

12. In a cash-register, the combination of a guideway for a series of tally-pieces, a setting mechanism for separating in said series different numbers of tally-pieces as desired, means for temporarily retaining in said guideway the number of tally-pieces so separated, a rotary indicator, a pinion on its axle, a rack engaging said pinion, a weight for moving said rack in one direction to successively expose the numbers on said indicator at an aperture, a bar connected with said rack movable into and out of said guideway and adapted to make contact with the top of the column of tally-pieces so temporarily retained in said guideway whereby a number on said indicator is exposed which corresponds to the number of tally-pieces so temporarily retained, means for releasing said tally-pieces so temporarily retained and thereby permitting the rack to cause the indicator to revolve in the same direction to the end of the movement of the rack, and means for moving said rack in the other direction to return the indicator to zero.

13. In a cash-register, the combination of a guideway for a series of tally-pieces, a setting mechanism for separating in said series different numbers of tally-pieces as desired, means for temporarily retaining in said guideway the number of tally-pieces so separated, a rotary indicator, a pinion on its axle, a rack engaging said pinion, means for moving said rack in one direction to successively expose the numbers on said indicator at an aperture, a bar connected with said rack movable into and out of said guideway and adapted to make contact with the top of the column of tally-pieces so temporarily retained in said guideway whereby a number on said indicator is exposed which corresponds to the number of tally-pieces so temporarily retained, means for releasing said tally-pieces so temporarily retained and thereby permitting the rack to cause the indicator to revolve in the same direction to the end of the movement of the rack, and means for moving said rack in the other direction to return the indicator to zero, and a single operating mechanism for actuating the means for moving the tally-pieces and the rack for returning the indicator to zero.

14. In a cash-register, the combination of a guideway for a series of tally-pieces, a setting mechanism for separating in said series different numbers of tally-pieces as desired, means for temporarily retaining in said guideway the number of tally-pieces so separated, a rotary indicator, a pinion on its axle, a rack engaging said pinion, a weight for moving said rack in one direction to successively expose the numbers on said indicator at an aperture, a bar connected with said rack movable into and out of said guideway and adapted to make contact with the top of the column of tally-pieces so temporarily retained in said guideway whereby a number on said indicator is exposed which corresponds to the number of tally-pieces so temporarily retained, means for releasing said tally-pieces so temporarily retained and thereby permitting the rack to cause the indicator to revolve in the same direction to the end of the movement of the rack, and means for moving said rack in the other direction to return the indicator to zero, and a single operating mechanism for actuating the means for moving the tally-pieces and the rack for returning the indicator to zero.

15. In a cash-register, the combination of a series of pairs of indicator-wheels, each pair having corresponding characters arranged in like series on their peripheries and having axes out of line but parallel, a gear on each axis, a pair of pinions set on each of a series of concentric sleeves and meshing with the gears of each pair of indicators, mechanism for rotating one of each pair of wheels to display the same characters on the different wheels in the same order at front and rear of the machine, and means for returning the wheels to zero.

16. In a cash-register, the combination of a series of pairs of indicator-wheels, each pair having corresponding characters arranged in series on their peripheries and having axes out of line but parallel, a spur-wheel on each axis, a shaft parallel to said axes and bearing pairs of pinions, each pair set on one of a series of concentric sleeves and meshing with the spur-wheels on the axes of each pair of indicator-wheels, and means for driving one of said indicator-wheels whereby the same characters on said indicator-wheel are displayed in the same order at front and rear of the machine, means for returning the wheels to zero, and means for moving said wheels in one direction.

17. In a cash-register, the combination of a pair of indicator-wheels having on their peripheries corresponding numerals in oppositely-arranged series and having axes out of line but parallel to each other, a casing having an aperture opposite the periphery of each of said wheels, equal spur-wheels, one upon each of said shafts, a third shaft parallel to each of said two shafts and bearing equal spur-wheels meshing with said two spur-wheels just mentioned and connected to each other, a pinion on one of said shafts, a rack meshing with said pinion, means for moving said rack to rotate said indicator-wheel in one direction, and other means for moving said rack in the other direction.

18. In a cash-register, the combination of a guideway for tally-pieces, means for actuating said tally-pieces, a movable indicating mechanism having display-characters whose indications are determined by the number of tally-pieces which have accumulated in said guideway.

19. In a cash-register, the combination of a guideway for tally-pieces, means for actuating said tally-pieces to register the sum of the amounts registered from a plurality of operations, an indicating mechanism for indicating by means of said tally-pieces the amounts to be registered at each particular operation, and rotary indicating mechanism whose indicating position is determined by the number of tally-pieces which have accumulated in said guideway to indicate the amount of the particular operation.

20. In a cash-register, a guideway for tally-pieces, means for actuating said tally-pieces to register the sum of the amounts registered from a plurality of operations, means for indicating separately by means of said tally-pieces the amounts to be registed at each particular operation, a rotary indicating mechanism normally set for operation and whose indicating position is determined by the number of tally-pieces which have accumulated to indicate the amount of the particular operation.

21. In a cash-register, the combination of guideways for tally-pieces comprising a registering-way and an elevating-way, a setting mechanism, means for forcing tally-pieces from said elevating-way into said registering-way to correspond with the actuation of the setting mechanism, means for retaining said tally-pieces in said registering-way, whereby the tally-pieces so retained indicate the amount of the particular transaction, rotary indicator mechanism normally held in position for operation, releasing means therefor, stop devices connected with said rotary indicator mechanism for making contact with the tally-pieces so retained and thereby determining the extent of rotation of said rotary indicating devices, means for releasing said tally-pieces from said retaining means, and means for returning said rotary indicator mechanism to zero.

22. In a cash-register, two indicators of the same denomination, each of which is reset to zero after each indication, one of which is moved to indicating position subsequently to the other and whose indicating position is determined by said other.

23. In a cash-register, two indicators of the same denomination, one of which is moved by the registering mechanism to indicate the operation thereof and the other of which is moved to a like indicating position determined by the position of said first indicating mechanism.

24. In a cash-register, the combination of a registering mechanism, an indicator operated by said registering mechanism, and a second indicator of the same denomination movable to indicating position by devices independent of said registering mechanism and whose indicating position is determined by the position of said first indicating mechanism.

25. In a cash-register, the combination of a registering mechanism, an indicator operated by said registering mechanism, and a second indicator of the same denomination movable to indicating position by devices independent of said registering mechanism, the movement of the second indicator being stopped by said first indicator to make the same indication.

26. In a cash-register, a setting mechanism, a guideway for tally-pieces, means for delivering into said way tally-pieces corresponding in number to the actuated setting mechanism, means for temporarily retaining the tally-pieces so delivered in said way, a rotary indicator, a latch for holding the same in non-indicating position, means for releasing said latch to permit the indicator to move to indicating position only when tally-pieces are temporarily retained as aforesaid in said guideway.

27. In a cash-register, the combination of a setting mechanism, an indicating-plate having a series of characters thereon, a latching mechanism for normally holding said indicator-plate at zero, means for moving said indicator-plate to display said characters successively at a reading-point, mechanism for releasing said catch, stopping mechanism for arresting said indicator-plate at different points corresponding to the actuation of the setting mechanism and displaying corresponding characters, means for releasing said stopping mechanism to permit said plate to continue its motion in the same direction until the remainder of the characters have passed said reading-point, and means for moving said indicator-plate in the opposite direction to return the same to zero.

28. In a cash-register, the combination of a setting mechanism, a driving mechanism, a series of indicator-wheels having characters upon the peripheries thereof, reading-apertures at which said characters are successively displayed, pinions connected to said indicator-wheels, weighted racks meshing with said pinions and movable in vertical guides, arms pivoted to said weighted racks, a latch engaging each arm to hold said rack in its highest position, a driving mechanism, a bar operated by the driving mechanism for lifting all said weighted racks to their highest positions, a cam connected to said driving mechanism, connections between said cam and said latch for releasing the latter, and means for stopping the released racks to expose characters on the indicators corresponding to the actuation of the setting mechanism.

29. In a cash-register, a guideway for tally-pieces, means for moving tally-pieces therein, means for separating in said guideway numbers of tally-pieces as desired, a pin projecting into said guideway for temporarily retaining therein the number of tally-pieces so separated, a rotary indicator having a series of characters on the periphery thereof, a reading-aperture for the successive display of said characters, a pinion upon each indicator, a weighted rack meshing with each pinion and movable in vertical guides, a latch for holding said weighted rack in its highest position, a driving mechanism for the register, a lever for releasing said catch whenever tally-pieces are retained in said guideway by said pin, and mechanism for actuating said lever operated by said driving mechanism.

30. In a cash-register, a setting mechanism comprising a movable plate and a stop-bar for determining the extent of motion of said plate, said plate being formed of a transparent substance having finger depressions therein and having a numeral or characterizing-mark under each depression.

31. In a cash-register, a setting mechanism comprising a movable part controlling the operation of the register, a movable plate and a stop-bar for determining the extent of motion of said plate, said plate being formed of a transparent substance having finger depressions therein and having a numeral or characterizing-mark under each depression.

32. In a cash-register, a driving mechanism, a series of movable parts for setting the machine for operation, a toothed device for each of said movable parts, a shaft having rigid thereon a series of dogs, one for each toothed device, and connections from said shaft to the driving mechanism of said cash-register for moving said dogs into the teeth of said toothed device to lock all the movable parts during the registering operations of said machine.

33. In a cash-register, a driving mechanism, a series of movable parts for setting the machine for operation, a toothed segment-plate attached to each of said rocking arms, a shaft having rigid thereon a series of dogs, one for each segment-plate and connections from said shaft to the driving mechanism of said cash-register for moving said dogs into the teeth of said toothed device to lock all the movable parts during the registering operations of said machine.

34. In a cash-register, a driving mechanism, a series of movable parts for setting the machine for operation, a toothed device for each of said movable parts, a transverse shaft having rigid thereon a series of dogs, one for each toothed device, and connections from said shaft to the driving mechanism of said cash-register for moving said dogs into the teeth of said segments to lock the same and connected parts during the registering operations of said machine, and for releasing said dogs from said segment-plates during the return motion of said movable parts.

35. In a cash-register, a driving mechanism, a series of rocking arms for setting the machine for operation, a toothed segment-plate attached to each of said rocking arms, a transverse shaft having rigid thereon a series of dogs, one for each segment-plate and connections from said shaft to the driving mechanism of said cash-register for moving said dogs into the teeth of said segments to lock the same and connected parts during the registering operations of said machine, and for releasing said dogs from said segment-plates during the return motion of said movable parts.

36. In a cash-register, a series of movable parts for setting the machine for operation, a toothed segment-plate attached to each of said movable parts, a transverse shaft having a series of dogs, one for each segment-plate, and connections from said shaft to the driving mechanism of said cash-register for throwing said dogs into the teeth of said segments to lock the same and connected parts during the registering operations of said machine, and for releasing said dogs from said segment-plates during the return motion of said movable plates, and when said movable parts are fully returned to initial position.

37. In a cash-register, a series of rocking arms for setting the machine for operation, a toothed segment-plate attached to each of said rocking arms, a transverse shaft having a series of dogs, one for each segment-plate, and connections from said shaft to the driving mechanism of said cash-register for throwing said dogs into the teeth of said segments to lock the same and connected parts during the registering operations of said machine, and for releasing said dogs from said segment-plates during the return motion of said movable plates, and when said rocking arms are fully returned to initial position.

38. In a cash-register, a driving mechanism, a series of movable parts for setting the machine for operation, a series of guideways for tally-pieces, mechanism actuated by said driving mechanism for discharging tally-pieces from the transfer-bar, mechanism actuated by the driving mechanism for returning the movable parts to initial position, a toothed device attached to each movable part, a shaft having rigid thereon a series of dogs one for each toothed device, and means operated by said driving mechanism for moving the shaft and forcing the dogs into the toothed devices to lock all the movable parts during movement of the transfer-bar.

39. In a cash-register, a driving mechanism, a printing mechanism, a series of movable parts for setting the machine for operation, a series of guideways for tally-pieces, mechanism actuated by said driving mechanism for discharging tally-pieces from the transfer-bar, mechanism actuated by the driving mechanism for returning the movable parts to initial position, a toothed device attached to each movable part, a shaft having rigid thereon a series of dogs one for each toothed device, and means operated by said driving mechanism for moving the shaft and forcing the dogs into the toothed device to lock all the movable parts during movement of the transfer-bar and during the printing operation.

40. In a cash-register, a setting mechanism for the registering mechanism, a cash-drawer, a record-strip mechanism in said drawer and adapted to be exposed when the drawer is opened, a series of sliding type-bars connected to said setting mechanism, and mechanism for rocking said type-bars against said record-strip mechanism.

41. In a cash-register, a setting mechanism for the registering mechanism, a check-strip platen, a record-strip platen, a series of sliding type-bars between said two platens having corresponding type upon their opposite faces, and mechanism for rocking said type-bars first against one platen and then against the other for printing the same characters upon a check-strip and a record-strip.

42. In a cash-register, a setting mechanism for the registering mechanism, a check-strip platen, a cash-drawer, record-strip mechanism in said drawer provided with a record-strip platen and in such position in said drawer as to be exposed when the drawer is opened, a series of sliding type-bars between said two platens connected to said setting mechanism and having corresponding type upon their opposite faces, and mechanism for rocking said type-bars first against one platen and then against the other for printing the same characters upon a check-strip and a record-strip.

43. In a cash-register, a setting mechanism for the registering mechanism, a check-strip platen, mechanism for feeding a check-strip across said platen in one direction, a record-strip platen, mechanism for feeding a record-strip across said latter platen in the other direction, a series of sliding type-bars between said two platens having corresponding type upon their opposite faces, and mechanism for rocking said type-bars first against one platen and then against the other for printing the same characters upon a check-strip and a record-strip.

44. In a cash-register, a setting mechanism for the registering mechanism, a check-strip platen, a record-strip platen, a series of sliding type-bars having corresponding characters upon their opposite faces, situated between said two platens and connected to said setting mechanism, a driving mechanism for operating said registering mechanism and connections from said driving mechanism to said type-bars for rocking the same first against one platen and then against the other for printing the same characters upon a check-strip and a record-strip.

45. In a cash-register, a setting mechanism for the registering mechanism, a check-strip platen, a record-strip platen, a series of sliding type-bars having corresponding characters upon their opposite faces, said bars being situated between said two platens and connected to said setting mechanism, a driving mechanism for operating said registering mechanism, connections from said driving mechanism to said type-bars for rocking the same first against one platen and then against the other for printing the same characters upon a check-strip and a record-strip, mechanisms for feeding the two strips and a cutter for severing individual checks from the check-strip after having been printed by said type-bars.

46. In a cash-register, a setting mechanism for the registering mechanism, a check-strip platen, a record-strip platen, a series of sliding type-bars having corresponding characters upon their opposite faces, said bars being situated between said two platens and connected to said setting mechanism, a driving mechanism for operating said registering mechanism, connections from said driving mechanism to said type-bars for rocking the same first against one platen and then against the other for printing the same characters upon a check-strip and a record-strip, mechanisms for feeding said two strips, a second check-strip platen across which said check-strip is fed, a swinging frame bearing dating and numbering wheels and mechanism for pressing said swinging frame to said second platen, whereby a date and number are printed upon a portion of the check-strip for another check than the one upon which said type-bars print.

47. In a cash-register, a setting mechanism, a series of sliding type-bars connected thereto and having type thereon, mechanism for rocking said type-bars to print upon a platen, a sliding frame movable in line with said type-bars and bearing an inking device, a spring for pressing said inking device toward said sliding bars, a cam device for holding said inking device away from the type-bars except when moved to printing-line, a detent for holding the said sliding frame adjacent to the printing-line of said type-bars, means for releasing the detent and inking the printing-line of type immediately after the bars are set and before the same are rocked and means, as springs, for propelling said sliding frame, and with it the inking device, out of the path of movement of the said rocking type-bars, and retracting means for the frame and bars.

48. In a cash-register, the combination with a printing mechanism, and means of actuating said printing mechanism, of a means for forcing said drawer open with each operation and means for disconnecting said drawer therefrom, means in said drawer for carrying a record-roll in position to receive the impression from said printing mechanism, means actuated by each opening and closing of said drawer for moving a new surface of said roll into position to be printed, and independent means actuated by the operation of the printing mechanism for moving a new surface of said roll into printing position when the drawer is disconnected from the opening mechanism.

49. In a cash-register, a single shaft for operating the whole register, a cash-drawer, a pulley loose upon said shaft, a continuous band connected to said pulley and to said drawer underneath the same, a lug on said shaft rotating therewith and carrying a spring-pressed pawl adjacent to the inner periphery of said pulley, a pair of wedge-like cams upon said inner periphery having separated abutment ends for engagement with said pawl, whereby on rotating said shaft, said pawl engages one of said abutment ends, and rotates said pulley to open said drawer, and upon closing said drawer, the rotation of the pulley independently of the shaft, causes said pawl to engage the other of said abutment ends and the rotation of the pulley by moving said drawer to open it rotates said pulley until said last-mentioned abutment end engages said pawl.

50. In a cash-register, the combination of a rotary operating-shaft, a pulley loose thereon, a pair of wedge-like cams on the inside of said pulley having separated abutment ends facing each other, a cash-drawer, an endless band attached to said pulley and to said drawer, a lug fast upon said shaft bearing a pawl adapted to engage said abutment ends, whereby, on rotating the shaft in one direction the pawl engages one of said abutment ends and the pulley is driven to open the drawer, and on rotating said pulley in the other direction the other abutment end tending to drive the shaft backward, and a stationary cam for moving and holding said pawl out of the path of the cam by which the pulley is driven when the shaft is in its normal position of rest.

51. In a cash-register, the combination of a cash-drawer, a rotary shaft, means for operating the same in one direction, a pulley loose on said shaft, an endless chain passing around said pulley and attached thereto and to said drawer, a clutch mechanism on said shaft engaging with said pulley when the shaft is turned in one direction and a stationary cam for holding the clutch from the pulley when the return of the draw revolves the pulley in the other direction.

52. In a cash-register, a cash-drawer, an endless chain or band having a portion extending in line with the line of movement of the drawer and around a driving-pulley and guide-pulleys, means for rotating the driving-pulley in one direction to open said drawer, means for disengaging said pulley from the means for rotating the same when the drawer is moved in the opposite direction, and means attached to said drawer for grasping and releasing said chain.

53. In a cash-register, a driving-shaft, a cash-drawer, a pulley loose on said shaft having the two wedge-like cams with abutment ends directed toward each other, one of which cams is thicker than the other, a pawl-arm on said fixed shaft and bearing a spring-pressed pawl adapted to engage said abutment ends and a stationary cam for disengaging the pawl from the end of the thinner of said cams when the shaft approaches the normal position of rest, and an endless band or chain connected to said pulley and to said drawer.

54. In a cash-register, a driving-shaft carrying a spring-pressed pawl, a cash-drawer, a pulley loose on said shaft having a cam provided with an abutment for the pawl, whereby the shaft drives the pulley in one direction, an endless chain or band passing around the pulley and connected thereto and to the drawer for opening the same when said pulley is rotated in said direction, and a stationary cam acting on said pawl when the driving-shaft is at its normal position of rest to retain said pawl in position to permit the pulley to revolve in the other direction and the abutment to pass said pawl without engagement therewith.

55. In a cash-register having a setting mechanism and a rotary crank, the combination of a driving-shaft, a loose pulley on said shaft, a cash-drawer, an endless chain attached to said drawer and to said pulley, a clutch mechanism coöperating with said shaft for driving the pulley to open the drawer and permitting backward rotating of the pulley to close the drawer without turning the shaft.

WILLIAM H. CLARK.

Witnesses:
A. E. WEET,
E. H. MARSELLUS.